(12) United States Patent
Taylor et al.

(10) Patent No.: US 12,455,427 B2
(45) Date of Patent: Oct. 28, 2025

(54) CAMERA FOCUSING INCLUDING LENS CENTRATION ESTIMATION USING VARIABLE FOCAL LENGTH PHASED METALENS

(71) Applicant: Aptiv Technologies AG, Schaffhausen (CH)

(72) Inventors: Ronald M. Taylor, Greentown, IN (US); Morgan Daniel Murphy, Kokomo, IN (US)

(73) Assignee: Aptiv Technologies AG, Schaffhausen (CH)

( * ) Notice: Subject to any disclaimer, the term of this patent is extended or adjusted under 35 U.S.C. 154(b) by 831 days.

(21) Appl. No.: 17/661,908

(22) Filed: May 3, 2022

(65) Prior Publication Data
US 2023/0358989 A1 Nov. 9, 2023

(51) Int. Cl.
*G02B 7/00* (2021.01)
*G01M 11/02* (2006.01)
(Continued)

(52) U.S. Cl.
CPC ......... *G02B 7/003* (2013.01); *G01M 11/0292* (2013.01); *G02B 1/002* (2013.01); *G02B 7/021* (2013.01); *G02B 7/023* (2013.01)

(58) Field of Classification Search
CPC .......... G02B 7/003; G02B 7/04; G02B 7/021; G02B 7/023; G02B 1/002; G02B 27/62; G01M 11/0292; G01M 11/0221
See application file for complete search history.

(56) References Cited

U.S. PATENT DOCUMENTS 4,693,555 A 9/1987 Arai et al.
6,144,510 A 11/2000 Neil et al.
(Continued)

FOREIGN PATENT DOCUMENTS

CN 102472884 A 5/2012
CN 202975472 U 6/2013
(Continued)

OTHER PUBLICATIONS

Engelberg, Jacob, Zhou, Chen, Mazurski, Noa, Bar-David, Jonathan, Kristensen, Anders and Levy, Uriel. "Near-IR wide-field-of-view Huygens metalens for outdoor imaging applications" Nanophotonics, vol. 9, No. 2, 2020, pp. 361-370. (Year: 2019).*
(Continued)

*Primary Examiner* — Hina F Ayub
*Assistant Examiner* — Christina I Xing
(74) *Attorney, Agent, or Firm* — Harness, Dickey & Pierce, P.L.C.

(57) ABSTRACT

Described is camera focusing including lens centration estimation using variable focal length phased metalenses. Camera modular alignment and test (CMAT) equipment checks the modular transfer function (MTF) performance of lenses and an image sensor. The CMAT equipment positions a variable focal length phased metalens between the lenses and the image sensor. The metalens includes multiple segments that provide a variable focus depending on distance and angle from boresight of the image sensor. By measuring optical characteristics of the lenses at two opposing segments of the metalens, defocusing effects and a lens centration tilt vector can be computed. Repositioning the lenses to align the centration tilt vector with the boresight of the image sensor improves the MTF performance. A final camera assembly with lenses in precise alignment with the
(Continued)

image sensor can be produced, which may improve production output by increasing pass rate at an end of line tester.

20 Claims, 15 Drawing Sheets

(51) Int. Cl.
*G02B 1/00* (2006.01)
*G02B 7/02* (2021.01)

(56) References Cited

U.S. PATENT DOCUMENTS

| | | | |
|---|---|---|---|
| 10,362,203 | B2 | 7/2019 | Taylor et al. |
| 10,408,416 | B2* | 9/2019 | Khorasaninejad ..... H04N 13/25 |
| 10,437,012 | B1 | 10/2019 | Gurin |
| 11,089,188 | B1 | 8/2021 | Taylor et al. |
| 11,089,197 | B1 | 8/2021 | Taylor et al. |
| 11,201,993 | B1 | 12/2021 | Wang et al. |
| 11,431,881 | B2 | 8/2022 | Taylor et al. |
| 2003/0226951 | A1 | 12/2003 | Ye et al. |
| 2007/0221826 | A1 | 9/2007 | Bechtel et al. |
| 2010/0265048 | A1 | 10/2010 | Lu et al. |
| 2011/0080479 | A1 | 4/2011 | Trumbo et al. |
| 2013/0274923 | A1* | 10/2013 | By ................. G02B 27/62 901/47 |
| 2015/0293330 | A1* | 10/2015 | Gutierrez .............. G03B 43/00 359/811 |
| 2016/0094841 | A1* | 3/2016 | Wang .................. H04N 17/002 348/44 |
| 2017/0082263 | A1 | 3/2017 | Byrnes et al. |
| 2017/0146806 | A1 | 5/2017 | Lin et al. |
| 2017/0195545 | A1 | 7/2017 | Campbell et al. |
| 2017/0201744 | A1 | 7/2017 | Wong et al. |
| 2017/0219739 | A1 | 8/2017 | Lin et al. |
| 2018/0059354 | A1 | 3/2018 | Gutierrez et al. |
| 2018/0292644 | A1 | 10/2018 | Kamali et al. |
| 2019/0094489 | A1 | 3/2019 | Dobashi |
| 2019/0154877 | A1 | 5/2019 | Capasso et al. |
| 2019/0170314 | A1 | 6/2019 | Lenef et al. |
| 2019/0178720 | A1 | 6/2019 | Padilla et al. |
| 2019/0383969 | A1 | 12/2019 | Badano et al. |
| 2020/0001787 | A1 | 1/2020 | Lu et al. |
| 2020/0096672 | A1 | 3/2020 | Yu et al. |
| 2020/0099851 | A1 | 3/2020 | Chino et al. |
| 2020/0183050 | A1 | 6/2020 | Lin et al. |
| 2020/0225386 | A1 | 7/2020 | Tsai et al. |
| 2020/0264343 | A1 | 8/2020 | Han et al. |
| 2021/0003382 | A1 | 1/2021 | Adie et al. |
| 2021/0014394 | A1* | 1/2021 | Han ................. G02B 5/286 |
| 2021/0044748 | A1 | 2/2021 | Hu et al. |
| 2021/0068665 | A1 | 3/2021 | Pahlevaninezhad et al. |
| 2021/0080819 | A1 | 3/2021 | Terasawa et al. |
| 2021/0132272 | A1 | 5/2021 | Zhu et al. |
| 2021/0172879 | A1 | 6/2021 | Chen et al. |
| 2021/0235001 | A1 | 7/2021 | Taylor et al. |
| 2021/0307608 | A1 | 10/2021 | Hu et al. |
| 2021/0337095 | A1 | 10/2021 | Taylor et al. |
| 2021/0337140 | A1 | 10/2021 | Siddique et al. |

FOREIGN PATENT DOCUMENTS

| | | |
|---|---|---|
| CN | 108241208 A | 7/2018 |
| CN | 108802862 A | 11/2018 |
| CN | 208283579 U | 12/2018 |
| CN | 109164518 A | 1/2019 |
| CN | 109507765 A | 3/2019 |
| CN | 109561243 A | 4/2019 |
| CN | 110455418 A | 11/2019 |
| CN | 111103739 A | 5/2020 |
| CN | 109391754 B | 11/2020 |
| EP | 3385766 A1 | 10/2018 |
| EP | 3445050 A1 | 2/2019 |
| EP | 3855246 A1 | 7/2021 |
| EP | 3992671 A1 | 5/2022 |
| WO | 2018118984 A1 | 6/2018 |
| WO | 2020214617 A1 | 10/2020 |

OTHER PUBLICATIONS

"Extended European Search Report", EP Application No. 20207221. 1, Mar. 26, 2021, 8 pages.
"Extended European Search Report", EP Application No. 21181685. 5, Nov. 24, 2021, 10 pages.
"Foreign Office Action", CN Application No. 202011378329.3, Dec. 31, 2021, 27 pages.
Afridi, et al., "Electrically Driven Varifocal Silicon Metalens", Oct. 2018, 17 pages.
Ding, et al., "Graphene aperture-based metalens for dynamic focusing of terahertz waves", Oct. 15, 2018, 13 pages.
Jang, et al., "Complex wavefront engineering with disorder-engineered metasurfaces", Jun. 27, 2017, 21 pages.
Jin, et al., "Temperature-tuned and excellent omnidirectional bending of light to the normal for energy concentration in an index-continuous structure", Jul. 27, 2020, 10 pages.
Kamali, et al., "Conformal and Tunable Optical Dielectric Metasurfaces Based on Flexible Stretchable Substrates", Oct. 2016, pp. 406-407.
Khorasaninejad, et al., "Metalenses at Visible Wavelengths: Diffraction-limited Focusing and Subwavelength Resolution Imaging", Jun. 3, 2016, pp. 1190-1193.
Li, et al., "A Metalens-Based Virtual Reality (VR) / Augmented Reality (AR) System", Jan. 2020, 2 pages.
Iu, et al., "Ultrathin van der Waals metalenses", Oct. 2018, 22 pages.
She, et al., "Adaptive Metalenses with Simultaneous Electrical Control of Focal Length, Astigmatism, and Shift", Feb. 23, 2018, 8 pages.
Yang, et al., "Multiobjective Firefly Algorithm for Continuous Optimization", Apr. 2013, 17 pages.
Yu, et al., "Flat Optics with Designer Metasurfaces", Nature Materials, vol. 13, Feb. 2014, pp. 139-150.
"Epoxy Adhesive Application Guide", Epoxy Technology, Jan. 1, 2016, 48 pages.
"Extended European Search Report", EP Application No. 18185005. 8, Oct. 31, 2018, 7 pages.
"Foreign Office Action", CN Application No. 201810876682.0, Apr. 10, 2020, 12 pages.
"Foreign Office Action", CN Application No. 202110698978.X, Jun. 29, 2022, 16 pages.
"Foreign Office Action", EP Application No. 18185005.8, May 12, 2021, 4 pages.
"Foreign Office Action", EP Application No. 18185005.8, Sep. 8, 2020, 5 pages.
"Foreign Office Action", EP Application No. 18185005.8, Nov. 11, 2019, 7 pages.
Yacobi, et al., "Adhesive Bonding in Microelectronics and Photonics", Journal of Applied Physics, American Institute of Physics, vol. 91, No. 10, May 15, 2002, 36 pages.
"Extended European Search Report", EP Application No. 22197227. 6, May 19, 2023, 11 pages.
"Extended European Search Report", EP Application No. 22197707. 7, May 19, 2023, 11 pages.
Bitzer, et al., "Active Alignment for Cameras in Mobile Devices and Automotive Applications", 2010 12th Electronics Packaging Technology Conference, Dec. 8, 2010, pp. 260-264.
Bräuniger, et al., "Automated Assembly of Camera Modules using Active Alignment with up to Six Degrees of Freedom", Mar. 8, 2014, 8 pages.
"Foreign Office Action", CN Application No. 202011378329.3, Jan. 28, 2023, 11 pages.
"Foreign Office Action", EP Application No. 20207221.1, Apr. 13, 2023, 5 pages.
"Extended European Search Report", EP Application No. 22198914. 8, Aug. 22, 2023, 9 pages.
"Extended European Search Report," EP Application No. 23163100. 3, Sep. 18, 2023, 8 pages.

(56) References Cited

OTHER PUBLICATIONS

Jacob Engelberg et al., "Near-IR wide field-of-view Huygens metalens for outdoor imaging applications", ARXIV.org, Cornell University Library, 201 Olin Library Cornell University, Ithaca, NY 14853, Jan. 22, 2019, XP081006647, 21 pages.
"Foreign Office Action", CN Application No. 202011378329.3, Sep. 5, 2022, 16 pages.
Office Action regarding European Patent Application No. 23163100.3, dated Jun. 26, 2025.

\* cited by examiner

CAMERA FOCUSING INCLUDING LENS CENTRATION ESTIMATION USING VARIABLE FOCAL LENGTH PHASED METALENS

BACKGROUND

Cameras are common in vehicles and serve a variety of purposes; images can be used alone or in combination with other sensor data to enable advanced safety functions, and semi-autonomous or even fully-autonomous controls. A modulation transfer function (MTF) is a performance measurement of camera systems. The MTF of a camera depends on its ability to focus a lens. Achieving a particular MTF performance may be a critical requirement for a final camera assembly. Camera modular alignment and test (CMAT) equipment may be used to check the focus ability of a set of lenses prior to using them in production. However, the focus ability of lenses can change from one camera to the next because of small variations in adhesives or other subtle final assembly conditions that alter the lenses' ability to focus. Even if the lenses satisfy initial MTF checks, the MTF performance measured by an end of line tester (EOLT) may be insufficient because of variations that occur during installation (e.g., the lenses being integrated with production components).

SUMMARY

This document describes one or more aspects of camera focusing including lens centration estimation using variable focal length phased metalenses. In one example, a method includes identifying, loaded in camera modular alignment and test (CMAT) equipment, a set of lenses and a set of camera components including an image sensor for a camera assembly. The method further includes executing, by the CMAT equipment, a multiple-axis lens alignment check to measure a modulation transfer function performance of the lenses after integration with the camera components. Executing the alignment check includes: positioning a variable focal length phased metalens between the lenses and the image sensor, measuring optical characteristics of the lenses at two or more opposing segments of the metalens to determine defocusing effects of the lenses after integration with the camera components, computing, based on the defocusing effects of the lenses, a centration tilt vector for the lenses relative a boresight of the image sensor, and repositioning the lenses to align the centration tilt vector with the boresight of the image sensor to generate instructions for precisely aligning the centration tilt vector with the boresight during production of the camera assembly. Thereby, the modulation transfer function performance of the camera assembly is improved when outside the CMAT equipment after the metalens is removed. The method further includes outputting, by the CMAT equipment, the instructions for precisely aligning the centration tilt vector with the boresight during production of the camera assembly.

In another example, an apparatus is described including a variable focal length phased metalens configured to be used by camera modular alignment and test (CMAT) equipment during a multiple-axis lens alignment check of a camera assembly to measure modulation transfer function performance of the camera assembly after integrating a set of lenses with an image sensor included among a set of camera components. The metalens comprises multiple concentric rings of lens elements positioned about a center of the metalens. Each of the rings is associated with a unique region of the metalens that is located about, and at a unique radial distance from, a center of the metalens. The lens elements of each of the rings is configured to provide a different focus capability than the lens elements of at least one other of the lens element rings. This is to enable the CMAT equipment to compute and align a centration tilt vector of the lenses to a boresight of the image sensor.

The techniques described herein, including any described process or method, may be performed by hardware or a combination of hardware and software executing thereon. For example, a computer-readable storage media may have instructions stored thereon and that when executed configure a processor to perform the described processes, methods, and techniques. A system may include means for performing the described methods, processes, and techniques. A processor or processor unit may be part of a system that is configured to execute the methods, processes, and techniques described herein.

This summary is provided to introduce aspects to actively select lenses for camera focus processes, which is further described below in the Detailed Description and Drawings. This summary is not intended to identify essential features of claimed subject matter, nor is it intended for use in determining scope of claimed subject matter.

BRIEF DESCRIPTION OF THE DRAWINGS

Details related to camera focusing including lens centration estimation using variable focal length phased metalenses are described in this document with reference to the Drawings, which may use same numbers to reference like features and components and hyphenated numbers to designate variations of these like features and components. The Drawings are organized as follows:

FIGS. 2-1 to 2-3 illustrate conceptual diagrams of changing camera MTF performance based on variations in lens position and orientation relative an image sensor;

FIG. 3-1 illustrates a conceptual view of an example camera assembly including a lens centration vector that is unaligned with a boresight of an image sensor;

FIG. 3-2 illustrates a line graph related to aspects of lens centration and its resulting focus variation across angles of field of view;

FIGS. 5-1 to 5-4 illustrate diagrams related to aspects of using variable focal length phased metalenses that enable camera focusing including lens centration estimation using the metalenses, in accordance with techniques of this disclosure;

DETAILED DESCRIPTION

Introduction

Figure 1:
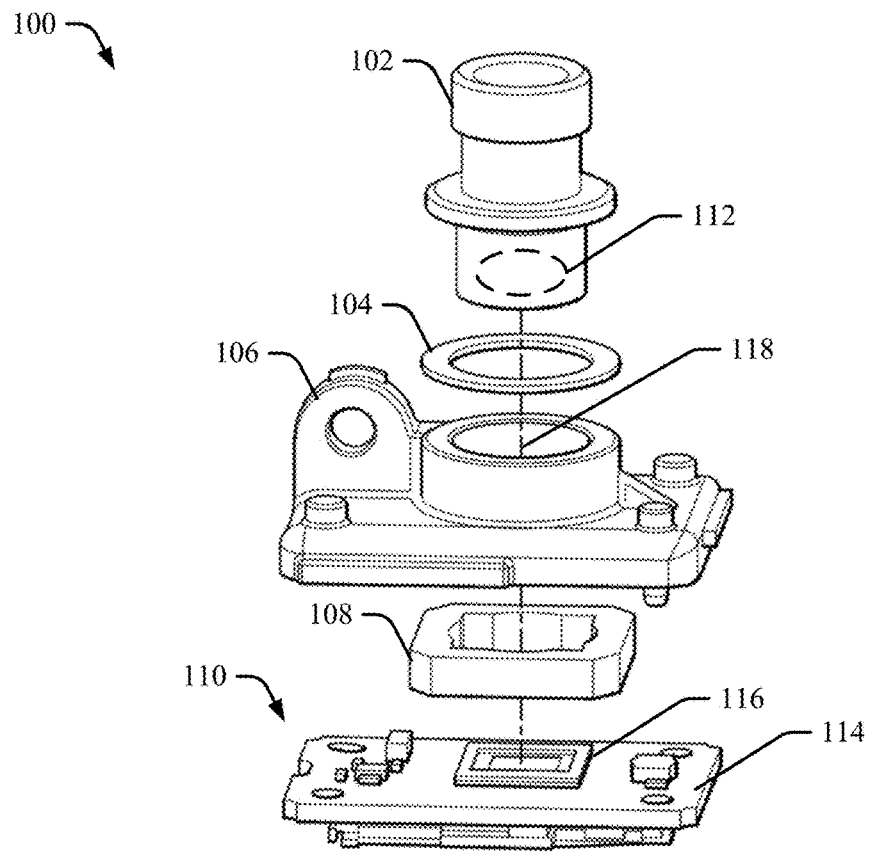
FIGS. 1-1 to 1-3 illustrate conceptual views of an example camera assembly that may benefit from camera focusing including lens centration estimation using variable focal length phased metalens, in accordance with techniques of this disclosure.

Using high-quality lenses or components does not guarantee a high-quality camera. Proper camera assembly is important to ensure a desired MTF, which enables high-quality imaging. Finding ways to produce high-quality camera assemblies, with less waste and in less time, can reduce costs, which allows their adoption by more vehicles for improved driving and safety. A high-quality camera assembly may minimize corner to corner image variation while maintaining balance between center and corner image values and/or ensuring quality camera focus to maintain image quality over long-term use. High-quality camera assemblies that include these and other characteristics are desired for vehicle use.

To achieve high quality, care is taken in selecting components for each camera assembly for proper fit and function. Checking and selecting lenses for proper functionality with corresponding components can be a complex and time-intensive task. Camera components can be loaded into CMAT equipment that dry-fit tests each set of lenses with a corresponding lens barrel and printed circuit board (PCB) assembly, which supports an image sensor. A computer-controlled CMAT check tests the focus ability of the lenses when positioned at different orientations relative to the image sensor. It is common for lenses to fail the CMAT check; lenses that fail are discarded or returned to manufacturers and those that pass can be used in a final assembly. Often, CMAT test results do not correlate with lens supplier data indicating the lenses have properties to pass the CMAT check. Production output is at risk of slowing if too many lenses fail, and the lens manufacturer cannot fulfill the demand for replacement parts. Even so, passing a dry-fit with the CMAT is not a guarantee of passing the EOLT.

The EOLT checks each camera assembly that is finally produced using lenses and corresponding camera components that pass the CMAT check. During final assembly, there may be shifts in the relative orientation of the parts. Adjustments to lens orientation, changes in PCB mounting relative to the lens barrel, PCB variation in planarity, thickness, or image sensor placement, and pallet variation are some examples of production variations that can cause the final camera assembly to fail the EOLT. For example, variations in lens position relative to the image sensor when compared to an intended lens position measured during the CMAT check may degrade MTF performance. When cameras are focused, there can be a small but significant asymmetry of the lens optical axis alignment to the boresight of the image sensor such that the focus characteristic of the lenses is not radially symmetric throughout the focal plane. This angular asymmetry can be quite small (e.g., less than one-tenth of a degree variation) but can result in erratic, inconsistent image quality.

Failures at the EOLT cannot be recovered because, at this point, the camera components have adhered to each other. Entire camera assemblies are scrapped if they fail to meet the minimum requirements of the EOLT. As mentioned earlier, replacement parts can be expensive and difficult to obtain. Achieving consistent camera assembly production output may be challenging if final camera assemblies and their internal components are scrapped at a high rate up to and including at the EOLT.

Described is camera focusing including lens centration estimation using variable focal length phased metalenses (referred to herein simply as a "metalens" in the case of just one, or multiple "metalenses" for a plurality). CMAT equipment checks MTF performance of lenses and an image sensor. The CMAT equipment positions a metalens between the lenses and the image sensor. The metalens includes multiple segments that provide a variable focus depending on distance and angle from the boresight of the image sensor. By measuring optical characteristics of the lenses at two opposing segments of the metalens, defocusing effects and a lens centration tilt vector can be computed. Repositioning the lenses to align the centration tilt vector with the boresight of the image sensor improves the MTF performance. A final camera assembly with lenses in precise alignment with the image sensor can be produced, which may improve production output by increasing the pass rate at an end-of-line tester.

A single metalens can be placed between a set of camera lenses and an image sensor, very near (e.g., at less than one millimeter) to the focal plane of the image sensor (e.g., adjacent to imager cover glass, on imager cover glass). Then a lens centration vector, including a rotational component and amplitude, is determined by comparison of variable focus results sampled at multiple symmetrical locations in a field of view. The metalens structure manipulates a phase shift of incoming light rays with lens elements (e.g., sub-wavelength structures) corresponding to multiple focal lengths at several positions across the field of view. The metalens includes lens elements with a phase profile that captures all wave-fronts exiting the lens, such that they arrive at the imager at the same time, thereby resulting in good focus for all conditions.

Example Camera Assembly

Figures 1, 2:
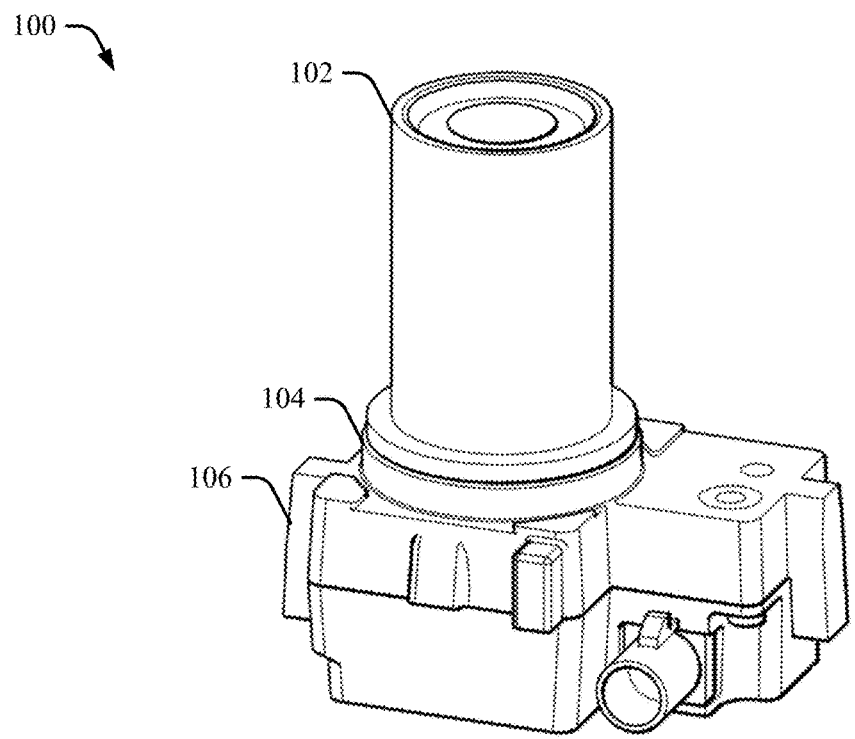
Figures 1, 2, 3:
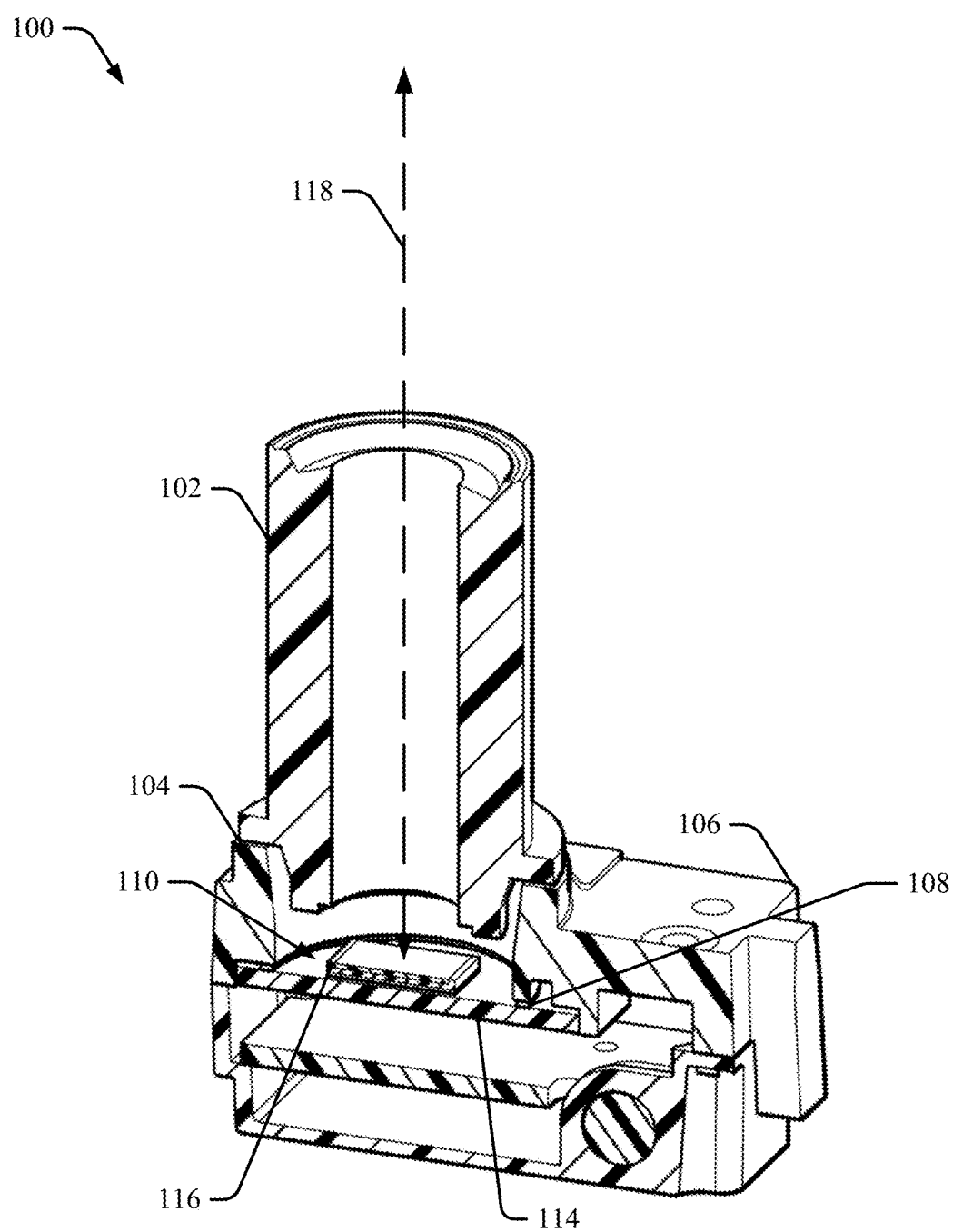
Figures 1, 2:
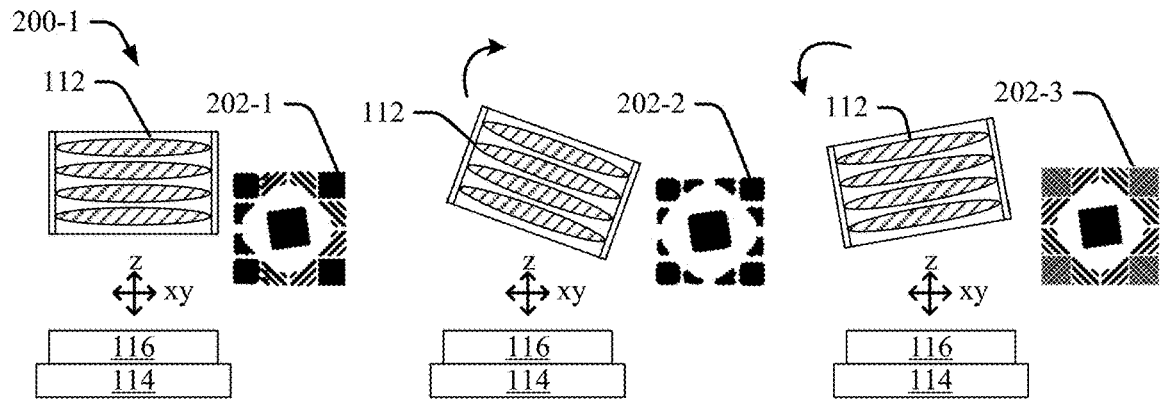
Figure 2:
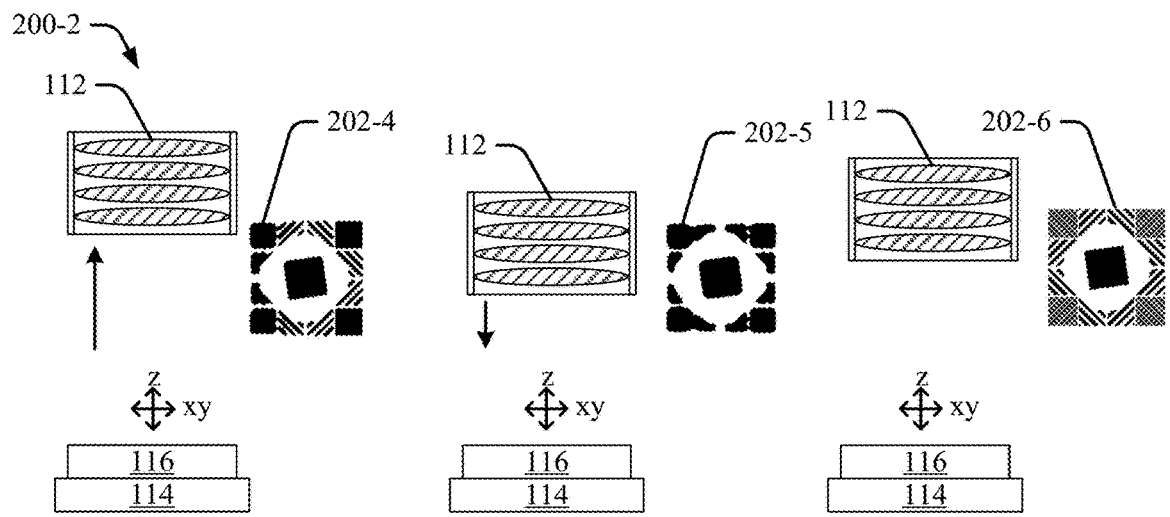
Figures 2, 3:
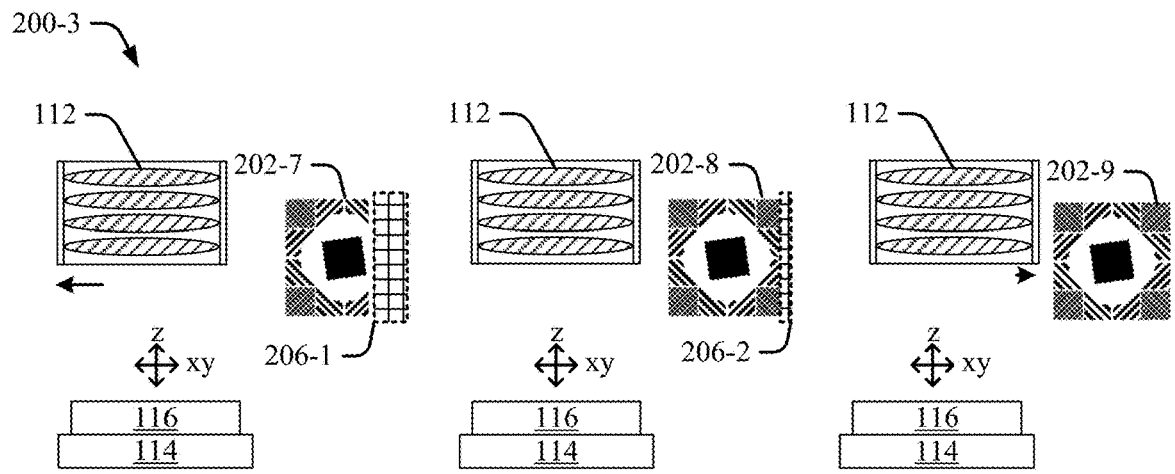
Figures 1, 3:
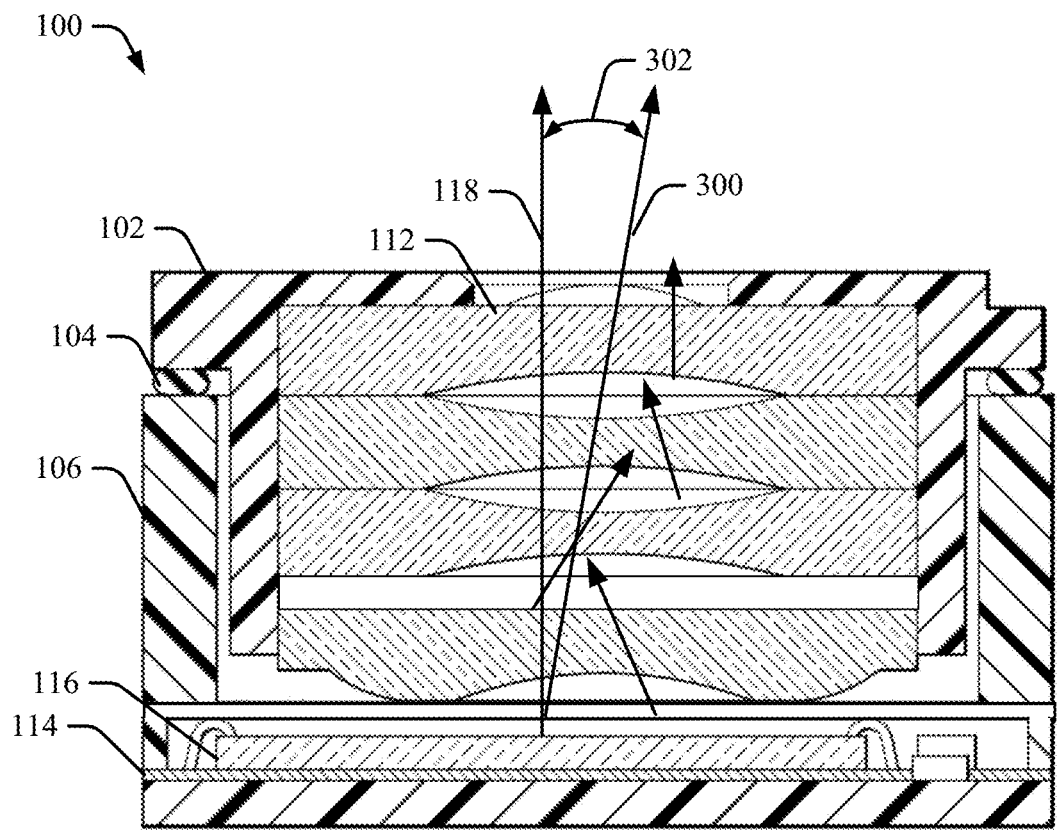
Figures 2, 3:
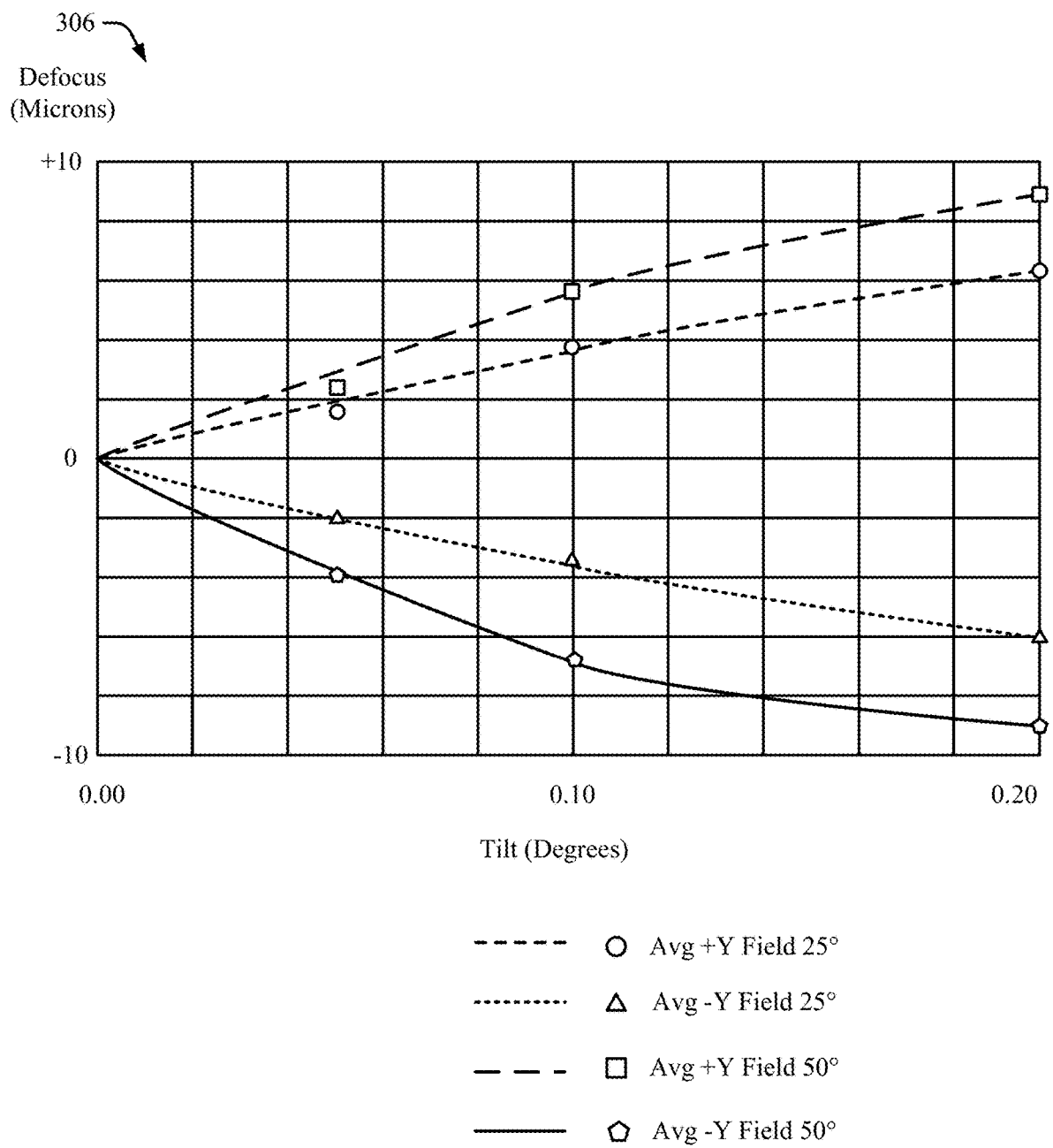

FIGS. 1-1 to 1-3 illustrate conceptual views of an example camera assembly that may benefit from camera focusing including lens centration estimation using variable focal length phased metalens, in accordance with techniques of this disclosure. In FIG. 1-1, an exploded view of a camera assembly 100 is shown, including a lens barrel 102 configured to hold one or more lenses 112, an adhesive material 104 configured to bond the lens barrel 102 to a housing 106 to provide structure and environmental protection to components of the camera assembly 100, and a gasket 108 configured to join the housing 106 to a PCB assembly 110, which includes an image sensor 116 arranged on a PCB 114. A boresight vector 118 of the image sensor 116 is shown. The boresight vector 118 is normal to a focal plane of the image sensor 116, which may or may not be exactly perpendicular to the PCB 114.

In FIG. 1-2, an assembled view of the camera assembly 100 is shown, with the multiple parts arranged in a final, assembled manner. The lens barrel 102 is partially inserted into an opening of the housing 106. When cured, the adhesive material 104 fixes the lens barrel 102 to the housing 106, which in combination with the gasket 108, protects components of the PCB assembly 110 arranged within.

FIG. 1-3 illustrates a cross-sectional view of the camera assembly 100. Although not shown for simplicity of the drawing, within the lens barrel 102, a set of lenses 112 (e.g., a lens assembly of one or more lenses) is stacked above the PCB assembly 110, including the image sensor 116 (e.g., an imager) mounted on the PCB 114. The lens holder 102 with the lenses 112 is positioned over the image sensor 116, and a processing unit (e.g., hardware and/or software) executing on the PCB 114 controls the image sensor 116 for capturing images in a field of view of the lens holder 102. The boresight vector 118 of the image sensor 116 is shown normal to the image sensor 116. This boresight vector 118 may be referred to as a mechanical boresight of the camera assembly 100.

It is important that the components of the camera assembly 100 are fitted and assembled with precision. Otherwise, the camera assembly 100 may fail at the EOLT. If the camera assembly 100 fails the EOLT, it cannot be recovered and the entire camera assembly 100 may be scrapped. The image sensor 116, the PCB 114, the lenses 112, and/or the rest of the camera assembly 100 may be discarded if unable to pass the EOLT, which results in considerable waste of time and resources. Obtaining replacement components to build new camera assemblies for those that fail can be difficult and expensive; many components are in short supply. Ensuring precise assembly and matching of components for the camera assembly 100 may ensure the camera assembly 100 passes the EOLT, which is important to achieving consistent production output with a low scrap rate.

Lens Positioning for Improved MTF

FIGS. 2-1 to 2-3 illustrate conceptual diagrams of changing camera MTF performance based on variations in lens position and orientation relative an image sensor. In each of the FIGS. 2-1 to 2-3, the lenses 112 of the camera assembly 100 are illustrated at different positions and orientations relative the image sensor 116 and the PCB 114.

FIG. 2-1 shows a scenario 200-1 in which an amount of tip or tilt associated with the lenses 112 can affect focus and MTF performance to produce an image 202-1, 202-2, or 202-3. In this scenario 200-1, the lenses 112 are oriented above the image sensor 116 at different angles of tilt with respect to a Z-axis (e.g., the boresight vector 118), which is perpendicular to an XY plane corresponding to a focal plane of the image sensor 116. The image 202-1 is somewhat out of focus when the lenses 112 are oriented with zero tilt or tip with respect to the image sensor 116. In contrast, with a positive tilt relative the Z-axis, the lenses 112 cause the image 202-2 to appear even more out of focus than the image 202-1. However, with a negative tilt relative the Z-axis, the lenses 112 cause the image 202-3 to come into focus more than the images 202-1 and 202-2.

A different scenario 200-2 is shown in FIG. 2-2 in which an amount of separation between the lenses 112 and the image sensor 116 can alter focus and MTF performance to generate an image 202-4, 202-5, or 202-6. The lenses 112 are oriented above the image sensor 116 at a first distance from the focal plane of the image sensor 116 (e.g., along the Z-axis), and the image 202-4 is out of focus. When the lenses 112 are oriented above the image sensor 116 at a shorter distance from the focal plane of the image sensor 116 than the first distance (e.g., along the boresight vector 118), then the image 202-5 is even more out of focus than the image 202-4. However, at a second position along the Z-axis, above the image sensor 116, which is not as far as the first distance and not as near as the shorter distance, the lenses 112 cause the image 202-6 to appear in focus.

A third scenario 200-3 is depicted in FIG. 2-3. The scenario 200-3 shows how an offset between a centerline of the lenses 112 and the Z-axis (e.g., along the boresight 118 of the image sensor 116) can affect focus and MTF performance in producing an image 202-7, 202-8, or 202-9. In the scenario 200-3, the lenses 112 are oriented above the image sensor 116 at a first distance offset along the X-axis or Y-axis, relative the Z-axis of the image sensor 116. The image 202-7 is missing a portion 206-1 of the field of view. When the lenses 112 are oriented above the image sensor 116 with the lenses 112 aligned to the image sensor 116 (e.g., with a zero offset), the image 202-8 is improved over the image 202-7, however, still a portion 206-2 is omitted thereby restricting what is otherwise observable in focus in the field of view. However, with a smaller lateral offset in the X-Y plane relative the lenses 112 and the image sensor 116 can capture the image 202-9, including the entire field of view of the camera assembly 100, without omitting either of the portions 206-1 or 206-2 that are omitted from the images 202-7 and 202-8.

The scenarios 200-1 to 200-3 demonstrate that precise positioning and orientation of the lenses 112 relative to the image sensor 116 are important to ensure adequate focus and satisfactory MTF for passing an EOLT. This also shows that when producing the camera assembly 100, small adjustments to orientation and positioning of the lenses 112 relative to the image sensor 116 during final assembly can greatly affect EOLT pass rate.

Unaligned Lens Centration Vector

FIG. 3-1 illustrates a conceptual view of an example camera assembly including a lens centration vector that is unaligned with a boresight of an image sensor. The camera assembly 100 is undergoing dry-fit testing in the view in FIG. 3. For example, the camera assembly 100 may be positioned within CMAT equipment configured to execute a computer-controlled check that tests MTF performance of the camera assembly 100 before allowing the camera assembly 100 to enter production where after final assembly it is further tested by the EOLT.

The boresight vector 118 of the camera assembly 100 is perpendicular to the focal plane of the image sensor 116, which is mounted on the PCB 114. The boresight vector 118 is different than a centration vector 300 of the lenses 112. The lens centration vector 300 represents a cumulative effect of the lens element surfaces when not normal to the boresight vector 118 (e.g., the mechanical boresight). Because the boresight vector 118 and the centration vector 300 are not coaxial, the camera assembly 100 can experience degraded MTF performance, especially in image corner focus. An angular difference 302 between the centration vector 300 and the boresight vector 118 is to be as close to zero to align the lenses 112 to the image sensor 116 for improved MTF performance.

Lens centration can be caused by glass edge build tolerances of the lenses 112, as well as improper spacer position. Relative alignment of elements of the lenses 112 relative to a mechanical centerline of the lens holder 102 can contribute to lens centration.

CMAT equipment executes a multiple-axis lens alignment process to reduce the difference 302 between the centration vector 300 and the boresight vector 118. A purpose of this alignment is to optimize focus of the lenses 112 to the sensing plane, to provide high quality focus results across the entire field of view. The multiple-axis lens alignment does not change the direction in which the camera assembly 100 is pointed; the boresight vector 118 remains unchanged, however, manipulating the lenses 112 in position or tilt can reduce the difference 302. Reducing the difference 302 to align the centration vector 300 to the boresight vector 118 as much as possible can improve image quality.

FIG. 3-2 illustrates a line graph 306 related to aspects of lens centration and its resulting focus variation across angles of field of view. As can be seen from the graph 306, a small amount of lens centration can cause significant focus variation across field angle. The graph 306 shows how the sensitivity of focus (or defocus) can be represented as a function of centration tilt, in this case, for two example radial field angle positions (e.g., at ±25° and ±50° field angle from center of the focal plane of the image sensor). If the centration vector 300, including a centration tilt vector, can be computed for each of the lenses 112, an improved multiple-axis alignment may be achievable. For example, information precisely defining the centration tilt vector 300 for the lenses 112 can be used to establish a position the lenses 112 relative the focal plane of the image sensor 116, including an amount of tilt to apply (if any) to an optical plane of each of the lenses 112. Even with this information, the difference 302 may be too great and the multi-axis alignment may be unable to improve the MTF performance of the lenses 112. For example, a change in back focal length to the camera assembly 100 of five or ten microns (e.g., 0.005 to 0.010 millimeters) may require a same amount of movement by the lenses. Such a focal length change may occur from introduction of a lens element that has an index of refractive that changes (e.g., by 3% to 6%, representing a delta change of 0.005-0.007). In some examples, element material of the lenses 112 can be made to change (e.g., from ten to fifteen microns). Curvature of the lenses 112 can be made to change (e.g., 250 to 500 millimeters in radial change to lens curvature). The changes to the lenses 112 can be caused by a combination of any of the above.

Rather than rely on existing ways to determine the centration vector 300, example CMAT equipment that is configured in accordance with the techniques described herein can execute additional steps during the multiple-axis alignment of the lenses 112. From using a variable focal length phased metalens to compute and precisely estimate the centration vector 300, the CMAT equipment can generate instructions for aligning the lenses 112, which effects a much better focus between the lenses 112 and the image sensor 116.

Aligned Lens Centration Vector

Figure 4:
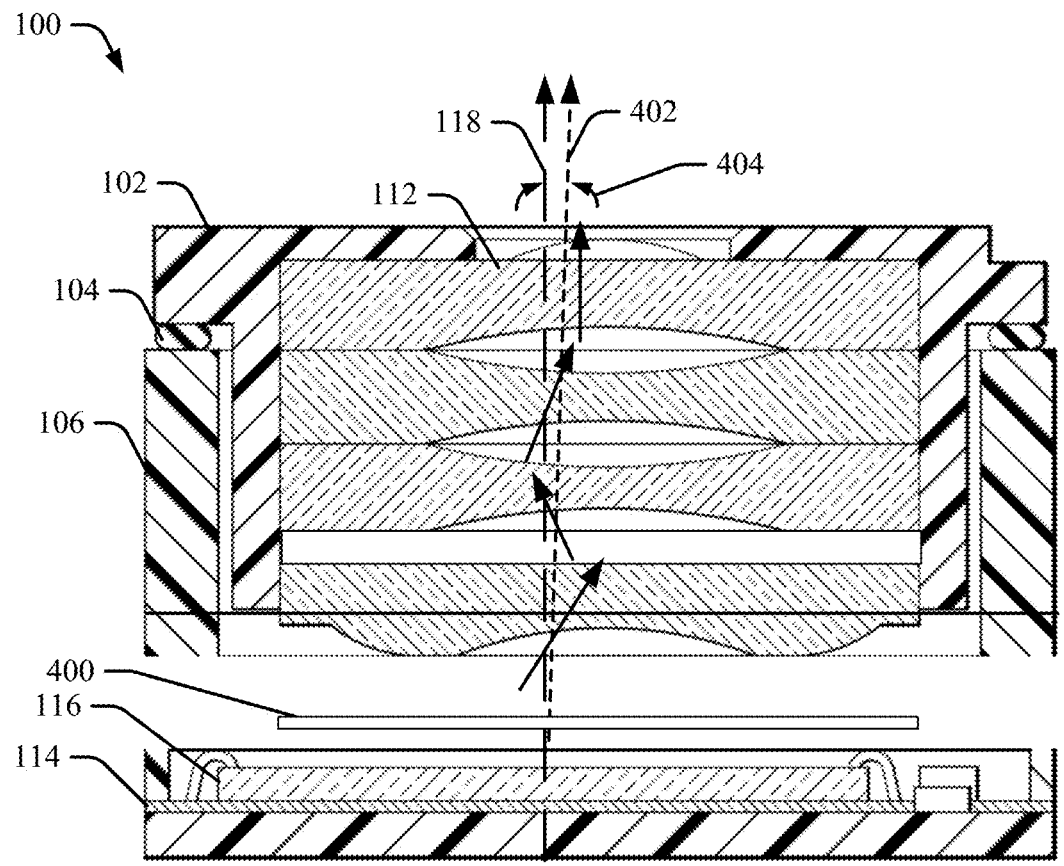
FIG. 4 illustrates a conceptual view of an example camera assembly including a variable focal length phased metalens for aligning a lens centration vector of the camera assembly with a boresight of an image sensor.

FIG. 4 illustrates a conceptual view of an example camera assembly including a variable focal length phased metalens 400 for aligning a lens centration vector of the camera assembly with a boresight of an image sensor. The metalens 400 can achieve near diffraction limited focusing over all visible wavelengths using precisely defined nanoscale sub-wavelength resolution structures. The metalens 400 is relatively thin and flat in comparison to the lenses 112. At less than one millimeter, the metalens 400 can be positioned between the narrow space that exists between the lenses 112 and the focal plane of the image sensor 116. This provides flexibility, allowing for compensation of temperature induced defocus, while maintaining independence from the lenses 112 and the rest of the camera assembly 100 under test.

A variable focal length characteristic of the metalens 400, i.e., a phase relationship for the metalens 400, is defined by Equation 1, which specifies a desired wavelength $\varphi_{nf}$ for nanostructures of the metalens 400.

$$\varphi_{nf}(x, y) = \frac{2\pi}{\lambda_d}\left(f - \sqrt{x^2 + y^2 + f^2}\right)$$ Equation 1

In the Equation 1, λ is the desired wavelength, f is the focal length for the lenses 112, and x and y are the coordinates of the nanostructures.

Using Variable Focal Length Phased Metalenses

Figures 1, 5:
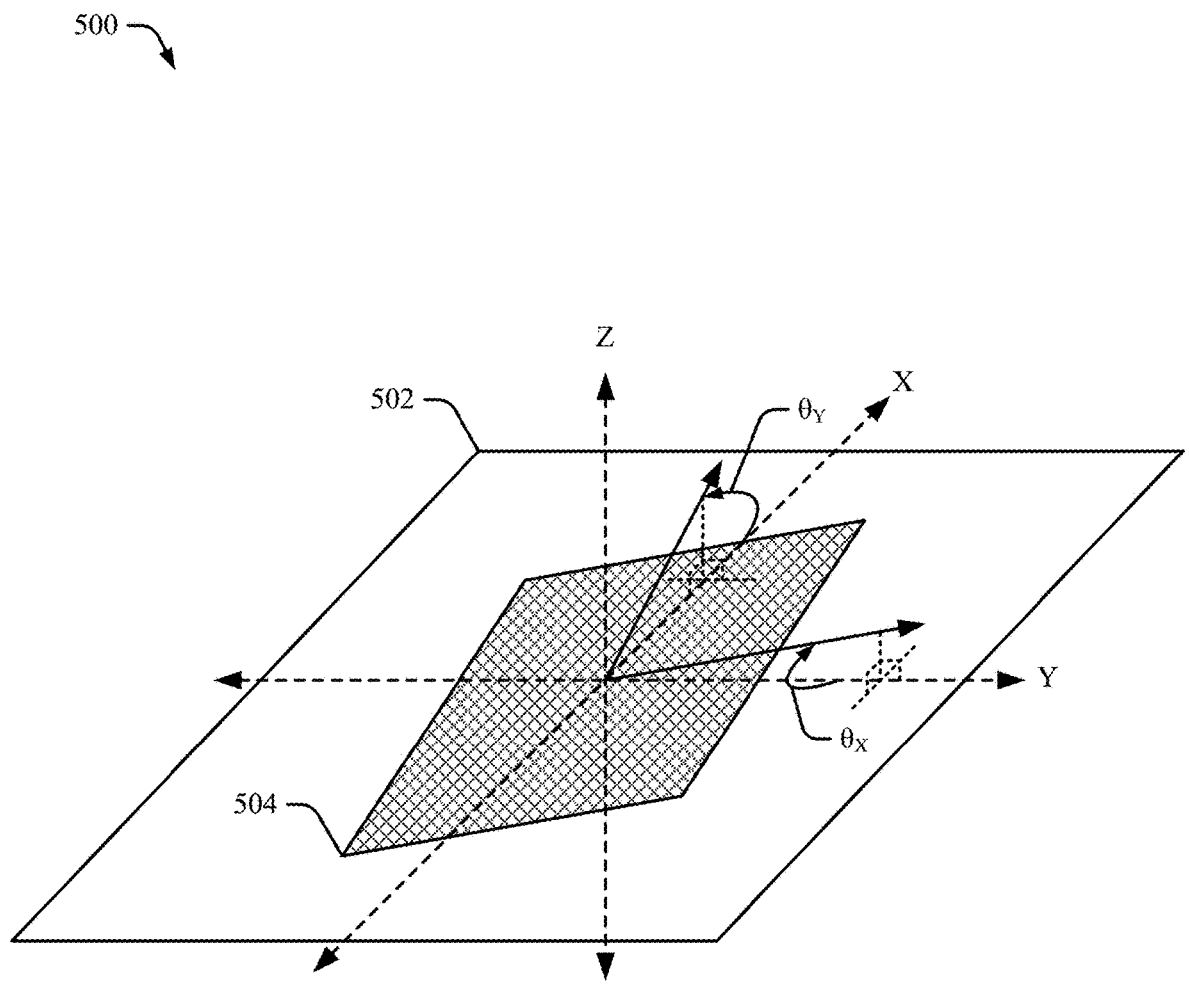
Figures 2, 5:
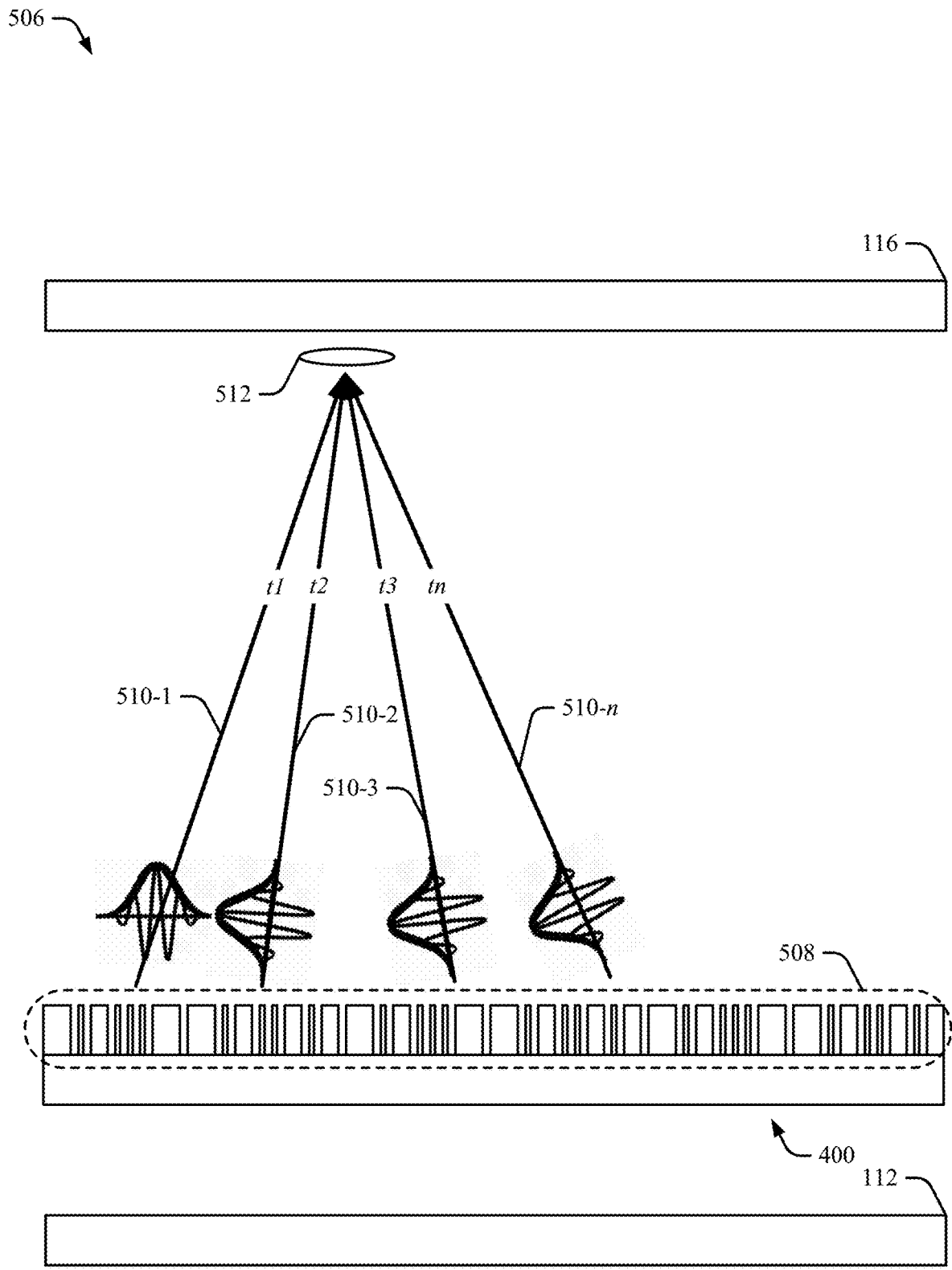
Figures 3, 5:
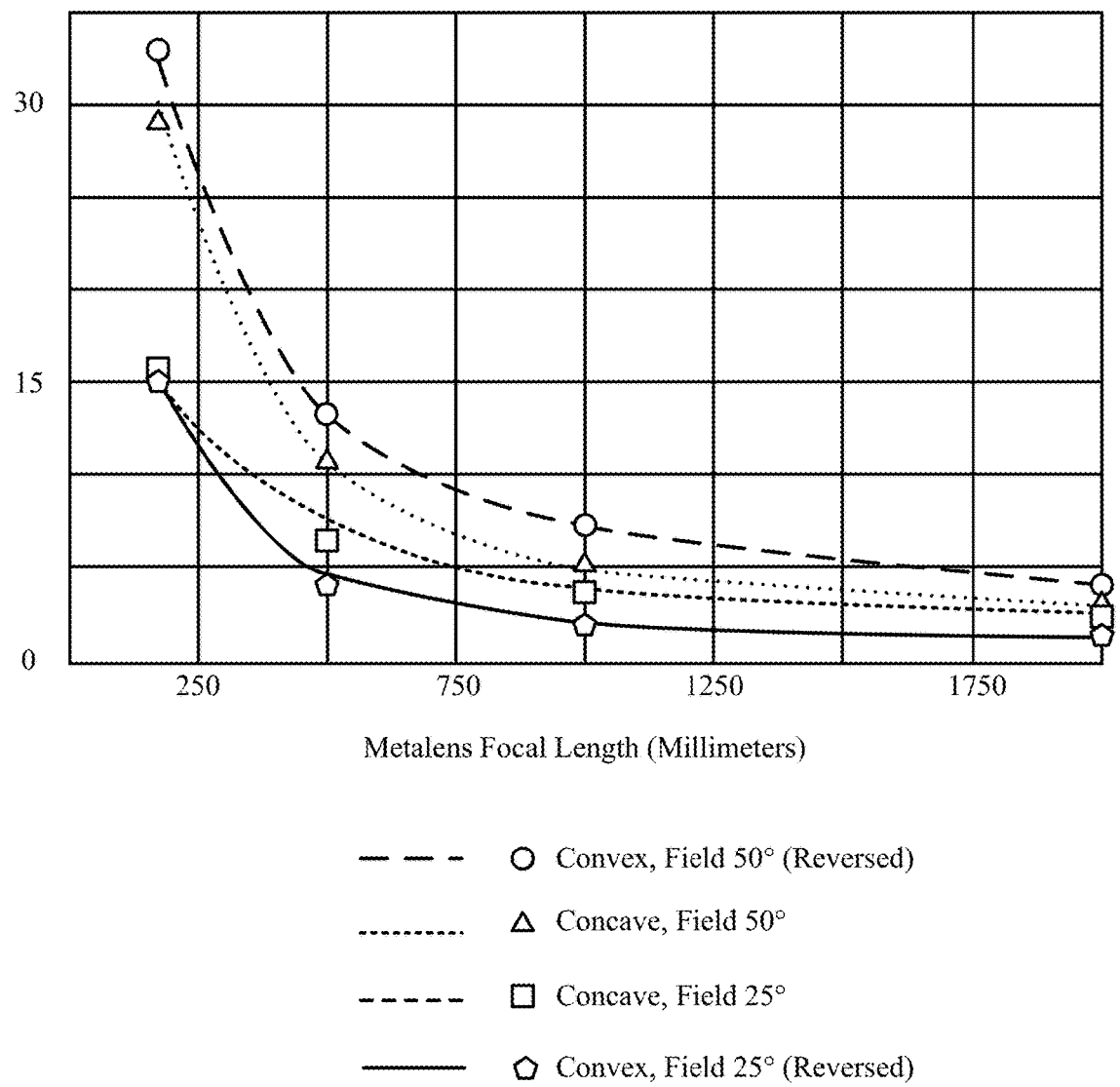
Figures 4, 5:
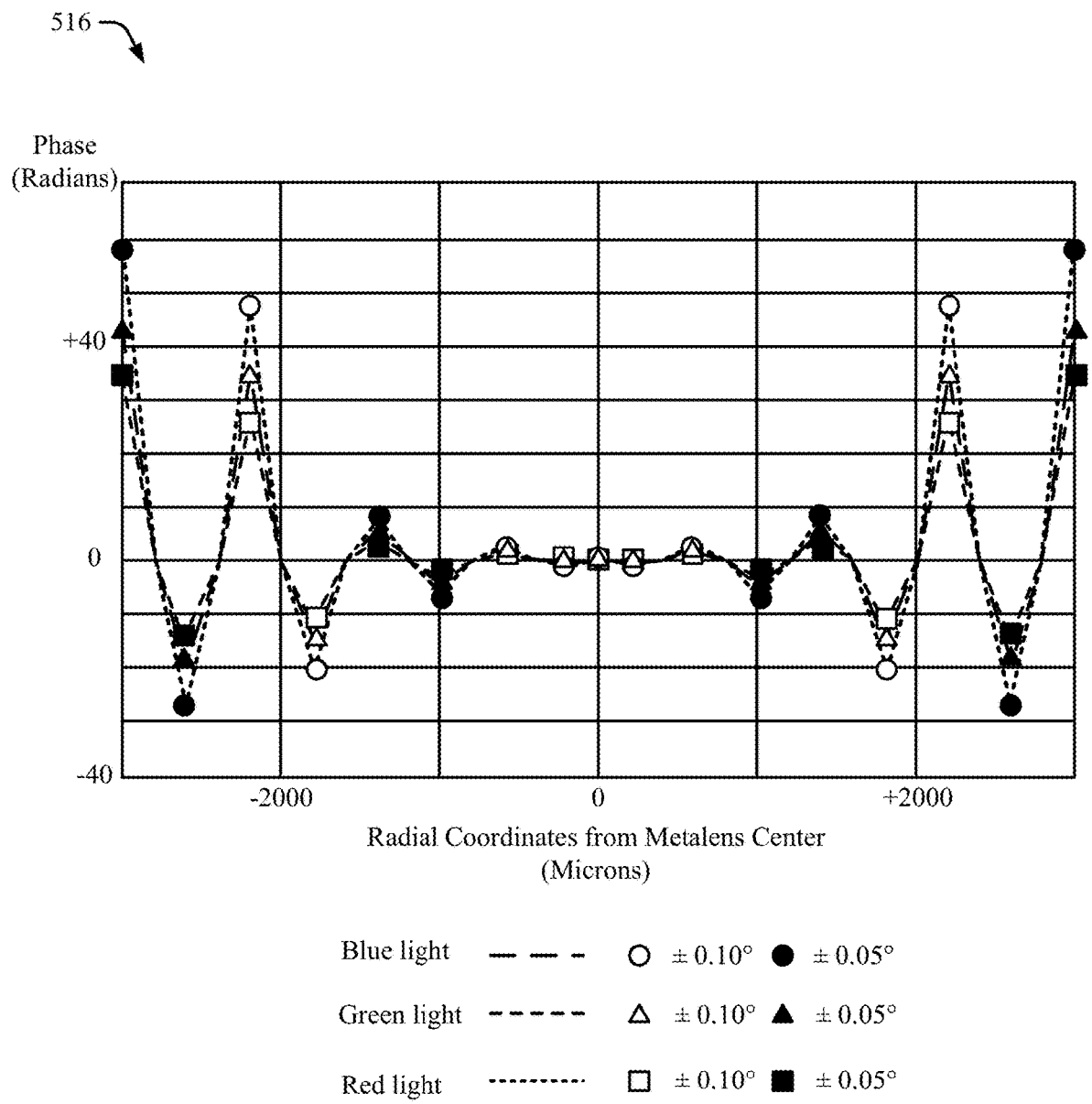

FIGS. 5-1 to 5-4 illustrate diagrams related to aspects of using variable focal length phased metalenses that enable camera focusing including lens centration estimation using the metalenses, in accordance with techniques of this disclosure. FIGS. 5-1 to 5-4 are described in the context of the camera assembly 100 and the metalens 400 described above. CMAT equipment can be configured to position the metalens 400 in between the focal plane of the image sensor 116 and the lenses 112 positioned in the lens holder 102.

FIG. 5-1 illustrates a conceptual diagram 500 of a centration vector axis system relative a boresight vector plane. When positioned in the lens holder 102, the CMAT equipment can cause the image sensor 116 to have a focal plane 502 that is not coaxial with a tilt plane 504 of the lenses 112. The tilt plane 504 is tilted around the X-axis in the diagram 500 by an angle $\theta_Y$ and around the Y-axis by an angle $\theta_X$. This combination of tilt in two directions represents a tilt vector. By determining the angles $\theta_X$ and $\theta_Y$ (including magnitude and direction), the centration vector 300 can be estimated.

Defocus through the lenses 112 can be measured at multiple positions of tilt along and across the field of view. This can be a complex task because, along the tilt vector, defocus is lower if the lenses 112 are tilted to be less than (i.e., behind) an ideal focus, and the defocus is higher if the lenses 112 are tilted to be more than (i.e., ahead of) the ideal focus. Positions on the tilt plane 504, which are normal to the tilt vector, can experience much less defocus. The metalens 400 can be used to simplify the process to measure defocus at multiple positions of tilt for estimating the centration vector 300.

FIG. 5-2 illustrates a conceptual view 506 of the metalens 400, in detail. The metalens 400 includes lens elements 508 (e.g., nanostructure) to provide locations on the metalens 400 at which multiple amounts of potential centration can be sampled along both the tilt plane 504 and the focal plane 502. From sampling the potential centration at different lens elements 508, CMAT equipment can adapt the multiple-axis alignment of the lenses 112 to reduce a difference 404 between a centration vector 402 of the lenses 112 and the boresight vector 118 of the camera assembly 100.

For example, the lens elements 508 may represent a thin, static element with a variable focal length depending on position from center of the metalens 400. The metalens 400 is placed at a fixed focus length from the lenses 112, between the lenses 112 and the image sensor 116, and very near to the focal plane 502 (e.g., within a few millimeters, just above a cover glass structure of the image sensor) to enable diagnostic tests for determining the centration vector 402.

The metalens 400 is configured to cause particular phase shift to light that passes through the lens element 508. A first phase shift by an amount of time t1 is applied by the metalens 400 to light rays 510-1 that converge on a focal point 512. Second and third phase shifts of amounts of time t2 and t3 are applied, respectively, to light rays 510-2 and 510-3, which converge on the focal point 512. Any quantity of phase shifts can be caused by the lens elements 508, including a $n^{th}$ phase shift by an amount of time tn, which is applied to light rays 510-n. A phase profile of the lens element 508 can be specifically designed to enable varying amounts of tilt correction over visible wavelengths of light to be determined.

Because the metalens 400 can be designed with the lens elements 508 to provide different optical characteristics across a field of view of the lenses 112, amounts of defocus correction for compensating for varying amounts of centration tilt can be achieved using samples from multiple segments within the metalens 400 that apply different phase shifts to light transmitted through the metalens 400. The metalens 400 can include the lens element 508 associated with different phase shifts to be intermingled along the segments being sampled to allow ample samples for enabling simultaneous comparisons of multiple tilt angle planes and direction vectors.

FIG. 5-3 illustrates a line graph 514 related to aspects of defocus correction that is achievable given various metalens focal lengths. As can be seen from the graph 514, four different functions of defocus relative position from metalens center are given, including a function for positive and negative twenty-five degrees from center of the metalens 400, in addition to positive and negative fifty degrees from the center.

By comparing defocus effects at opposing segments for multiple field planes that indicate potential tilt vectors and normal vectors to the tilt vector, the centration vector 402 and the difference 404 between that and the boresight vector 118 (e.g., magnitude and direction) can be determined. For example, the opposing segments can include no correction (e.g., zero tilt), low tilt (e.g., plus or minus five one hundredths of a degree), and high tilt (e.g., plus or minus ten one hundredths of a degree).

FIG. 5-4 illustrates a line graph 516 related to aspects of defocus correction that is achievable given various metalens focal lengths. The graph 514 conveys a phase profile to allow for change in defocus across each visible light spectrum (e.g., blue, green, and red wavelengths).

Example Phased Metalenses

Figure 6:
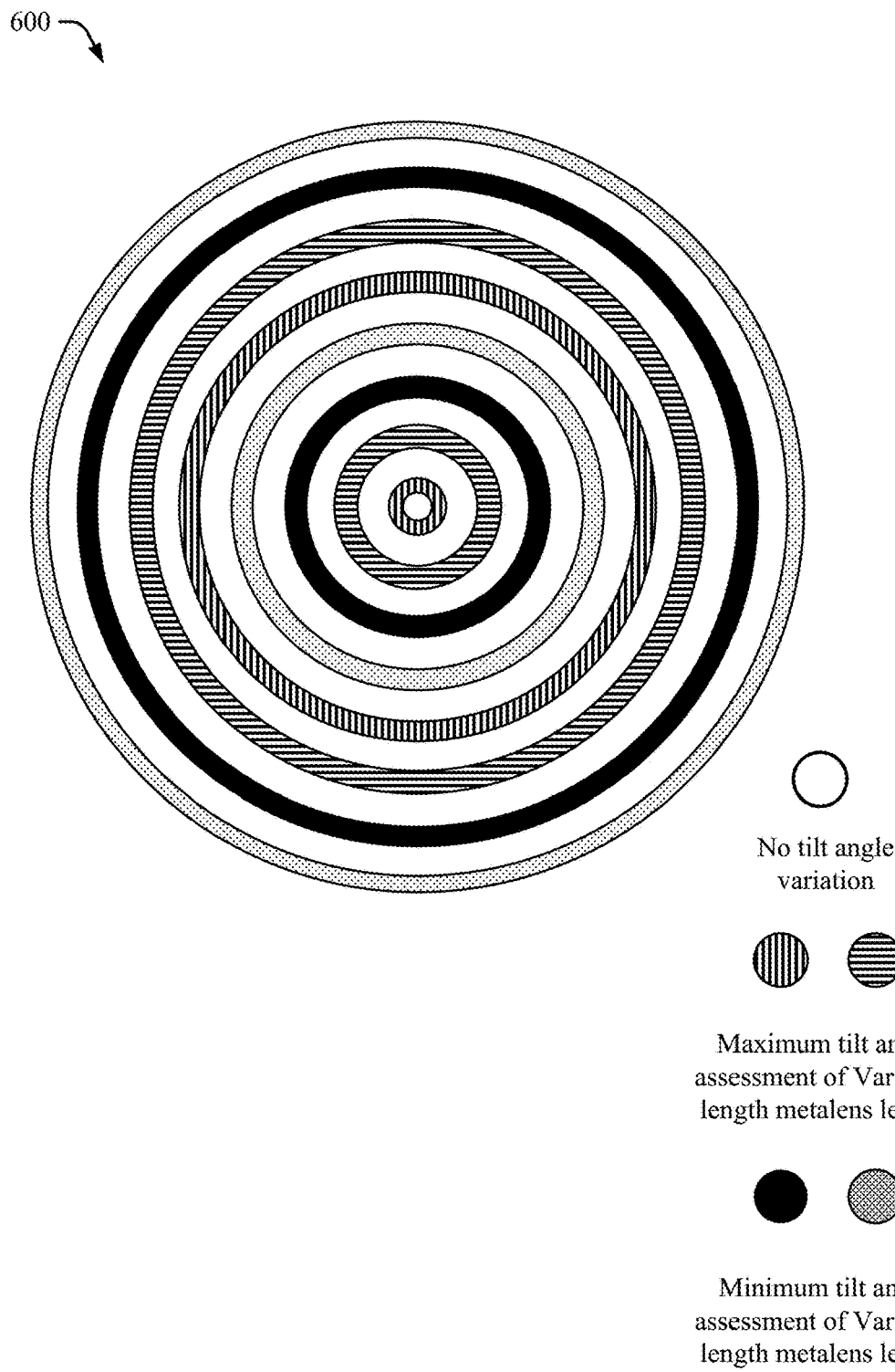
FIG. 6 illustrates a conceptual diagram of an example variable focal length phased metalens for camera focusing including lens centration estimation, in accordance with techniques of this disclosure.

FIG. 6 illustrates a conceptual diagram of an example variable focal length phased metalens for camera focusing including lens centration estimation, in accordance with techniques of this disclosure. A metalens 600 is illustrated having an example phase profile that intermingles multiple different tilt angle corrections. Each tilt angle correction region represents a ring of lens elements positioned about a center of the metalens 600. Each ring is at a different and unique distance from the center. In the metalens 600, there are sixteen different rings including a center (circle) region, each being associated with one of five different tilt angle corrections. The different tilt angle corrections include a no tilt angle correction (e.g., zero degrees), a positive, minimum tilt angle correction and a negative, minimum tilt angle correction (e.g., plus and minus five one hundredths of a degree), and a positive, maximum tilt angle correction and a negative, maximum tilt angle correction (e.g., plus and minus ten one hundredths of a degree). Achieving a phase profile with varying polarity in tilt angle corrections can be accomplished from embedding rings with convex or concave focal length lens elements into the metalens 600.

Said differently, in the metalens 600 there are several different types of rings, including convex or concave rings, and rings with no defocus. A first type of the different types of rings includes first lens elements for enabling a minimum tilt angle assessment, and a second type of the different types of rings includes second lens elements for enabling a maximum tilt angle assessment. A third type of the different types of rings includes third lens elements for enabling an opposite polarity minimum tilt angle assessment, and a fourth type of the different types of rings includes fourth lens elements for enabling an opposite polarity maximum tilt angle assessment. As mentioned, a fifth type of the different types enables a zero tilt angle assessment. There may be more than five different angle corrections enabling further tilt angle assessments in other examples depending on complexity of the sampling desired.

The next examples demonstrate that, with lens elements arranged in the rings as shown in FIG. 6, CMAT equipment can sample the metalens 600 at multiple locations along opposing segments of lens elements. Two segments of the metalens 600 are opposing segments if their respective lens elements follow paths along opposite angles from center. In other words, two opposing segments of the metalens 600 can include two radially opposing segments (e.g., one at forty-five degrees and the other at negative forty-five degrees) that provide different focus capability at different radial distances along those segments from a center of the metalens 600.

Figure 7:
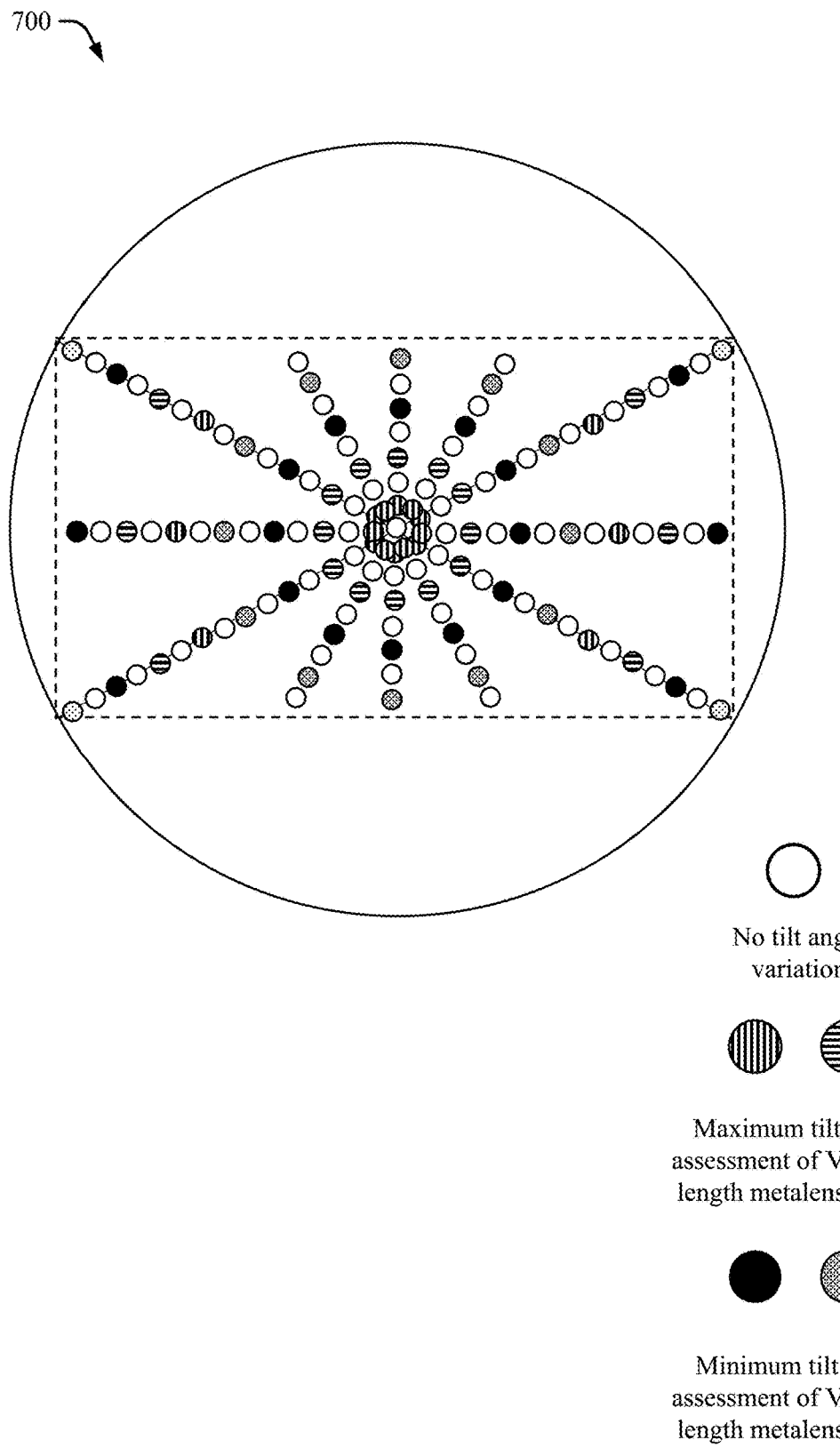
FIGS. 7-9 illustrate a conceptual diagrams for sampling an example variable focal length phased metalens for camera focusing including lens centration estimation, in accordance with techniques of this disclosure.
Figure 8:
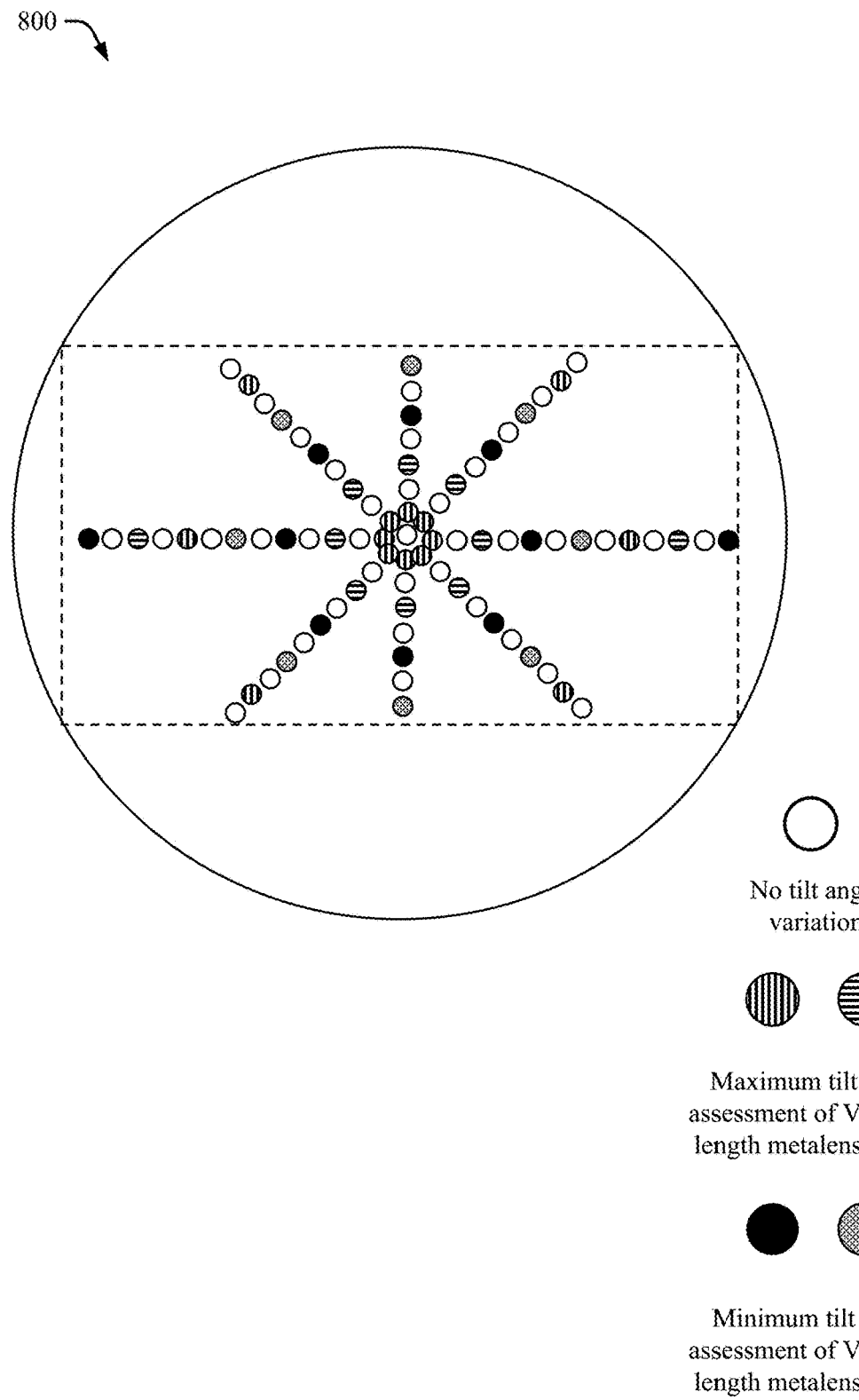
Figure 9:
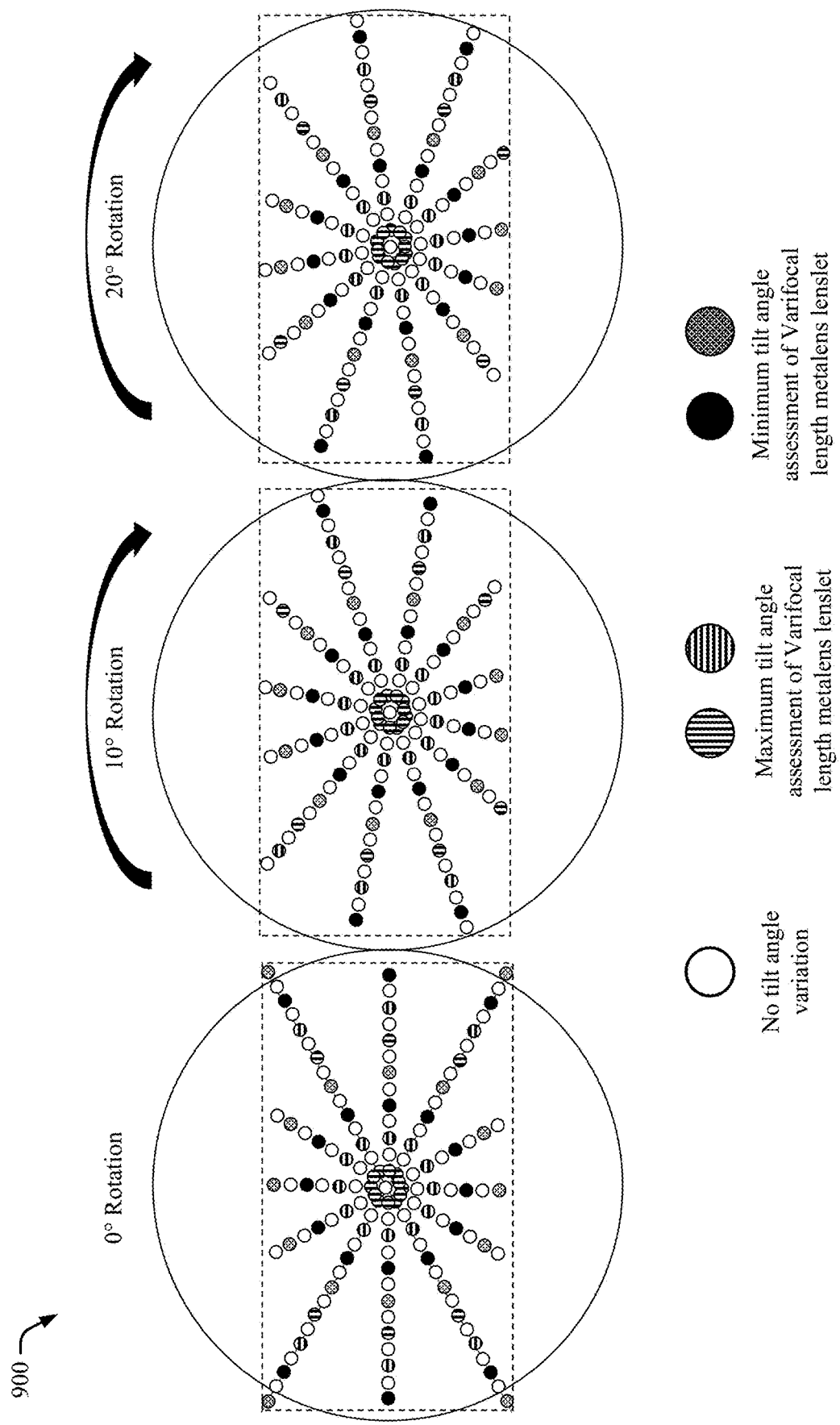

FIGS. 7-9 illustrate a conceptual diagrams for sampling an example variable focal length phased metalens for camera focusing including lens centration estimation, in accordance with techniques of this disclosure. For example, the metalens 600 may be sampled in various ways to achieve different levels of granularity in the information that is ultimately obtained from the samples.

FIG. 7 illustrates a conceptual diagram 700 demonstrating CMAT equipment taking samples of the metalens 600 from segments that are separated by thirty degree increments. FIG. 8 illustrates a conceptual diagram 800 demonstrating CMAT equipment taking samples of the metalens 600 from segments that are separated by forty five degree increments. The samples are illustrated as circles with different shading depending on an amount of tilt angle correction associated with the ring of lens elements at that location of the metalens 600. Whether eight segments are sampled, as in the case of FIG. 8, or twelve, as in the case of FIG. 7, the CMAT equipment uses the samples of segments to estimate the centration vector 402.

FIG. 9 illustrates a conceptual diagram 900 demonstrating CMAT equipment taking samples of the metalens 600 with additional granularity than what is provided by angular separation of the segments themselves. The CMAT equipment may be configured to further apply an amount of rotation to the metalens 600 to take additional sets of the samples at different angles of rotation about the center of the metalens 600. Applying a rotation to the metalens 600 this way allows a different distribution of segments to be sampled than what is provided by using a static rotation applied to the metalens 600. Further granularity in the information that is collected for estimating the centration vector 402 may be obtained.

The form of sampling shown in FIG. 9 enables the CMAT equipment to measure the optical characteristics of the lenses 112 at the two or more opposing segments by first positioning the metalens 600 in a first position of rotation relative the image sensor 116, and assessing the minimum tilt angle and the maximum tilt angle of the lenses 112 from there, at the first position of rotation. Next, the metalens 600 is positioned in a second position of rotation relative the image sensor 116, and the minimum tilt angle and the maximum tilt angle of the lenses are assessed from the second position of rotation. The minimum tilt angle and the maximum tilt angle of the lenses 112, generally, may be assessed further when the metalens 600 is positioned in one or more third positions of rotation relative the image sensor 116, to finish out sampling for all three-hundred degrees of rotation (if desired). Based on a combination of the minimum tilt angle and the maximum tilt angle of the lenses 112 that is assessed for each rotation position, the minimum tilt angle and the maximum tilt angle of the lenses 112, generally, can be assessed.

From obtaining multiple samples of each of the five different title angle corrections of the metalens 600, the CMAT equipment can measure a change in defocus across the field of view of the lenses 112. The CMAT equipment can estimate the centration vector 402 of the lenses 112 based on a defocus profile obtained from the defocus measurements. This may improve accuracy of the estimate of the centration vector 402 to enable more accurate correction of the difference 404 between that and the boresight vector 118.

Process for Camera Focusing Including Lens Centration Estimation Using Metalens

Figure 10:
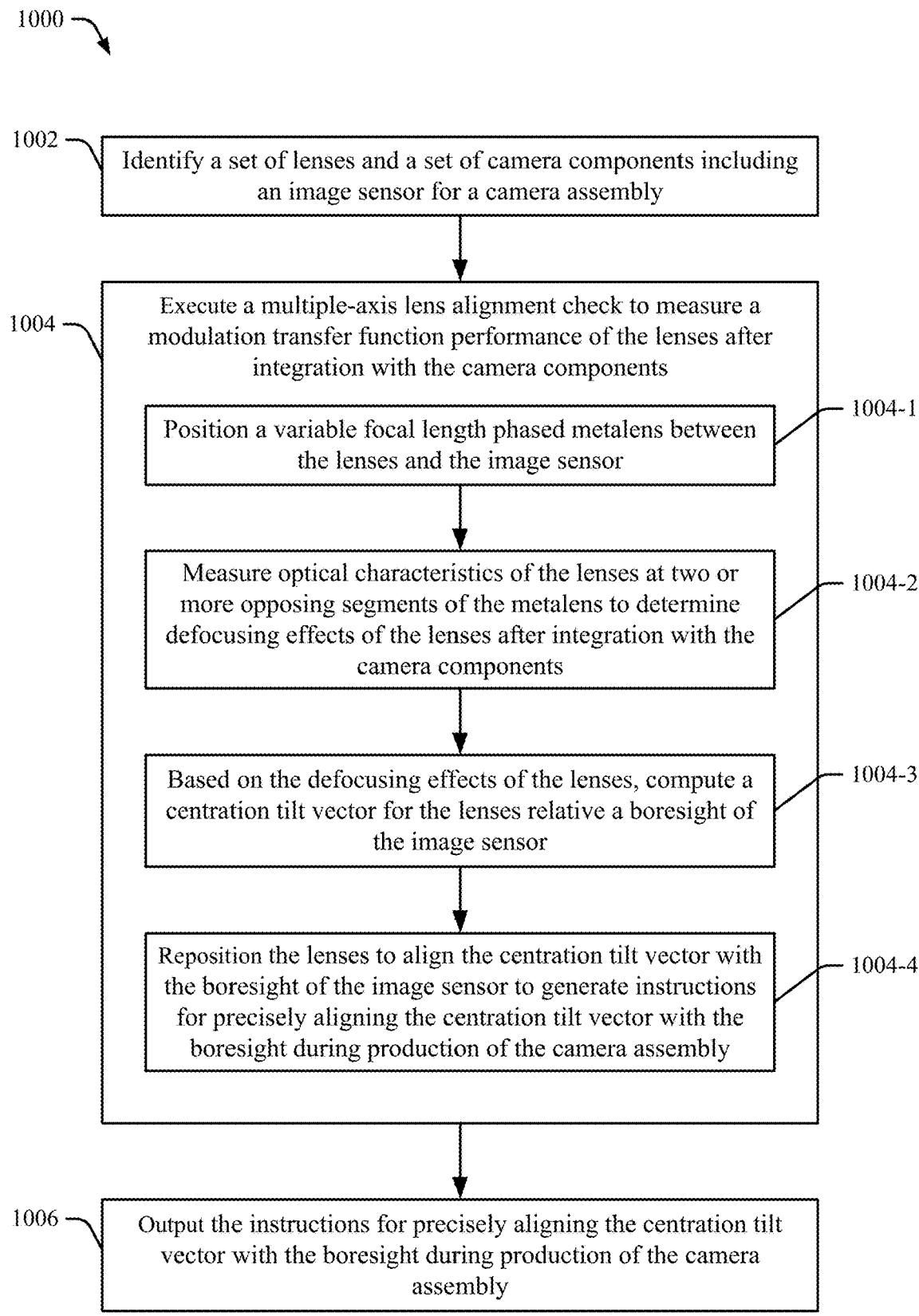
FIG. 10 illustrates a flow diagram for camera focusing including lens centration estimation using variable focal length phased metalens, in accordance with techniques of this disclosure.

FIG. 10 illustrates a flow diagram for camera focusing including lens centration estimation using variable focal length phased metalens, in accordance with techniques of this disclosure. The process 1000 is described in the context of FIGS. 1-1 to 9, as if being performed by CMAT equipment, including at least one processor configured to execute the steps of the process 1000 and/or means for performing the steps of the process 1000. For example, CMAT equipment can include a processor operably coupled with non-transitory storage media that maintains executable instructions. When the instructions are executed by the processor, the processor is configured to execute the process 1000. The steps of the process 1000 may be performed in a different order, with additional steps, or with fewer steps, than is shown in FIG. 10.

At 1002, a set of lenses and a set of camera components including an image sensor for a camera assembly are selected. For example, CMAT equipment is configured to identify, from a pallet of the CMAT equipment, the lenses 112 and the PCB 114 including the image sensor 116. Some CMAT equipment does not use pallets; the lenses 112 and the PCB 114 can be loaded individually, from trays, or from other sources.

At 1004, a multiple-axis lens alignment check is executed to measure an MTF performance of the lenses after integration with the camera components. For example, the CMAT equipment changes position or tilt of the lenses 112 relative the image sensor 116 to check focus capability across the field of view. In executing the multiple-axis alignment, the CMAT equipment estimates the centration vector 402 of the lenses 112 to generate instructions for tilting and repositioning the lenses 112 to align the centration vector 402 to the boresight vector 118 to achieve improved focus performance across the field of view.

At 1004-1, a variable focal length phased metalens is positioned between the lenses and the image sensor. For example, the CMAT equipment positions the metalens 600 within one millimeter of cover glass of the image sensor 116 to arrange the metalens 600 between the lenses 112 and the focal plane 502.

At 1004-2, optical characteristics of the lenses are measured at two or more opposing segments of the metalens to determine defocusing effects of the lenses after integration with the camera components. For example, the CMAT equipment checks the defocus characteristics of the lenses 112. Based on expected defocus characteristics caused by the metalens 600, additional defocus caused by the disorientation of the centration vector 402 relative the boresight vector 118, which is normal to the focal plane 502, can be computed.

At 1004-3, based on the defocusing effects of the lenses, a centration tilt vector for the lenses is computed relative a boresight of the image sensor. For example, the CMAT equipment can generate a phase profile of the lenses 112 that represents just the defocusing effects caused by the lenses 112, which are isolated from those caused by the metalens 600.

At 1004-4, the lenses are repositioned to align the centration tilt vector with the boresight of the image sensor to generate instructions for precisely aligning the centration tilt vector with the boresight during production of the camera assembly. For example, the CMAT equipment can reposition the lenses 112 laterally, or tilt the lenses 112, relative the focal plane 502 to reduce the defocusing effects caused by the lenses 112. With the lenses 112 repositioned, the CMAT equipment determines an improved position and tilt for the lenses 112, thereby improving the MTF performance of the camera assembly 100 when outside the CMAT equipment and after the metalens 600 is removed.

It should be understood that further modifications to the lens 112 position, the metalens 600 position, or the image sensor 116 can be made by the CMAT equipment to achieve other sampling effects and improve estimations of the centration vector 402. For example, the CMAT equipment may reposition the lenses to align the centration tilt vector with the boresight of the image sensor by adjusting an offset distance applied to the lenses 112 relative the image sensor 116. The offset distance may be a vertical offset applied to the lenses 112 along the boresight 118 of the image sensor 116 at a height above the focal plane 502 of the image sensor 116. The offset distance may be a lateral offset applied to the lenses 112 in one or two directions that are parallel to the focal plane 502 of the image sensor 116.

At 1006, the instructions are output for precisely aligning the centration tilt vector with the boresight during production of the camera assembly. For example, the CMAT equipment outputs instructions for producing the camera assembly 100 with the position and tilt applied during the multiple-axis alignment. This may increase a likelihood of passing final checks at the EOLT.

Further Examples

Some further examples in view of the techniques described above include:

Example 1: A method comprising: identifying, loaded in camera modular alignment and test (CMAT) equipment, a set of lenses and a set of camera components including an image sensor for a camera assembly; executing, by the CMAT equipment, a multiple-axis lens alignment check to measure a modulation transfer function performance of the lenses after integration with the camera components, wherein executing the alignment check includes: positioning a variable focal length phased metalens between the lenses and the image sensor; measuring optical characteristics of the lenses at two or more opposing segments of the metalens to determine defocusing effects of the lenses after integration with the camera components; computing, based on the defocusing effects of the lenses, a centration tilt vector for the lenses relative a boresight of the image sensor; and repositioning the lenses to align the centration tilt vector with the boresight of the image sensor to generate instructions for precisely aligning the centration tilt vector with the boresight during production of the camera assembly, thereby improving the modulation transfer function performance of the camera assembly when outside the CMAT equipment after the metalens is removed; and outputting, by the CMAT equipment, the instructions for precisely aligning the centration tilt vector with the boresight during production of the camera assembly.

Example 2: The method of any of the previous examples, wherein the two or more opposing segments of the metalens comprise two or more radially opposing segments that provide different focus capability at different radial distances from a center of the metalens.

Example 3: The method of any of the previous examples, wherein: the metalens comprises multiple concentric rings of lens elements positioned about a center of the metalens, each of the rings is associated with a unique region of the metalens that is located about, and at a unique radial distance from, a center of the metalens; and the lens elements of each of the rings is configured to provide a different focus capability than the lens elements of at least one other of the rings to enable the CMAT equipment to compute and align a centration tilt vector of the lenses to a boresight of the image sensor.

Example 4: The method of any of the previous examples, wherein the two or more opposing segments of the metalens comprise two or more radially opposing segments of the metalens that pass in opposite directions from the center of the metalens and through at least two of the rings.

Example 5: The method of any of the previous examples, wherein the metalens comprises at least two different types of rings, each of the rings being associated with one of the at least two different types.

Example 6: The method of any of the previous examples, wherein a first type of the different types of rings includes first lens elements for enabling a minimum tilt angle assessment, and a second type of the different types of rings includes second lens elements for enabling a maximum tilt angle assessment, and optionally, wherein a third type of the different types of rings includes third lens elements for enabling an opposite polarity minimum tilt angle assessment, and a fourth type of the different types of rings includes fourth lens elements for enabling an opposite polarity maximum tilt angle assessment.

Example 7: The method of any of the previous examples, wherein measuring the optical characteristics at the two or more opposing segments comprises: positioning the metalens in a first position of rotation relative the image sensor; assessing the minimum tilt angle and the maximum tilt angle of the lenses at the first position of rotation; positioning the metalens in a second position of rotation relative the image sensor; and assessing the minimum tilt angle and the maximum tilt angle of the lenses at the second position of rotation; and assessing, based on a combination of the minimum tilt angle and the maximum tilt angle of the lenses that is assessed for the first and second positions, the minimum tilt angle and the maximum tilt angle of the lenses, generally.

Example 8: The method of any of the previous examples, wherein the minimum tilt angle and the maximum tilt angle of the lenses, generally, is assessed further based on the minimum tilt angle and the maximum tilt angle of the lenses assessed when the metalens is positioned in one or more third positions of rotation relative the image sensor.

Example 9: The method of any of the previous examples, wherein positioning the variable focal length phased metalens between the lenses and the image sensor comprises positioning the metalens adjacent to a protective glass of the image sensor.

Example 10: The method of any of the previous examples, wherein repositioning the lenses to align the centration tilt vector with the boresight of the image sensor comprises adjusting a tilt angle applied to the lenses relative the image sensor.

Example 11: The method of any of the previous examples, wherein repositioning the lenses to align the centration tilt vector with the boresight of the image sensor comprises adjusting an offset distance applied to the lenses relative the image sensor.

Example 12: The method of any of the previous examples, wherein the offset distance comprises a vertical offset applied to the lenses along the boresight of the image sensor at a height above a focal plane of the image sensor.

Example 13: The method of any of the previous examples, wherein the offset distance comprises a lateral offset applied to the lenses in one or two directions that are parallel to a focal plane of the image sensor.

Example 14: The method of any of the previous examples, wherein the boresight of the image sensor is normal to a focal plane of the image sensor.

Example 15: The method of any of the previous examples, wherein the boresight of the image sensor comprises a mechanical boresight of the camera assembly after integration of a lens holder and the image sensor.

Example 16: The method of any of the previous examples, wherein the image sensor is mounted to a printed circuit board.

Example 17: An apparatus comprising: a variable focal length phased metalens configured to be used by camera modular alignment and test (CMAT) equipment during a multiple-axis lens alignment check of a camera assembly to measure modulation transfer function performance of the camera assembly after integrating a set of lenses with an image sensor included among a set of camera components, the metalens comprising multiple concentric rings of lens elements positioned about a center of the metalens, each of the rings being associated with a unique region of the metalens that is located about, and at a unique radial distance from, a center of the metalens; the lens elements of each of the rings configured to provide a different focus capability than the lens elements of at least one other of the lens element rings to enable the CMAT equipment to compute and align a centration tilt vector of the lenses to a boresight of the image sensor.

Example 18: A system comprising: a variable focal length phased metalens including two or more opposing segments; and camera modulation and alignment test (CMAT) equipment configured to perform the method of any of the previous examples.

Example 19. A system comprising means for performing the method of any previous example.

Example 20. A system configured to output instructions to precisely align a centration tilt vector of the lenses with a boresight of the image sensor.

Example 21. A system comprising a processor configured to perform the method of any previous example.

Example 22. A computer readable media including instructions that, when executed, cause a processor to perform the method of any previous example.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to camera systems, similar problems associated with assembling other types of sensors can occur. Therefore, although described to improve camera assembly performance, the techniques of the foregoing description can be adapted and applied to other problems to effectively assemble at low cost sensor devices with high precision.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
   identifying, loaded in camera modular alignment and test (CMAT) equipment, a set of lenses and a set of camera components including an image sensor for a camera assembly;
   executing, by the CMAT equipment, a multiple-axis lens alignment check to measure a modulation transfer function performance of the lenses after integration with the camera components, wherein executing the alignment check includes:
   positioning a variable focal length phased metalens between the lenses and the image sensor;
   measuring optical characteristics of the lenses at two or more opposing segments of the metalens to determine defocusing effects of the lenses after integration with the camera components;
   computing, based on the defocusing effects of the lenses, a centration tilt vector for the lenses relative to a boresight of the image sensor; and
   repositioning the lenses to align the centration tilt vector with the boresight of the image sensor to generate instructions for precisely aligning the centration tilt vector with the boresight during production of the camera assembly; and
   outputting, by the CMAT equipment, the instructions for precisely aligning the centration tilt vector with the boresight during production of the camera assembly.

2. The method of claim 1, wherein the two or more opposing segments of the metalens comprise two or more radially opposing segments that provide different focus capabilities at different radial distances from a center of the metalens.

3. The method of claim 1, wherein:
   the metalens comprises multiple concentric rings of lens elements positioned about a center of the metalens,
   each of the rings is associated with a unique region of the metalens that is located about, and at a unique radial distance from, a center of the metalens; and
   the lens elements of each of the rings is configured to provide a different focus capability than the lens elements of at least one other of the rings to enable the CMAT equipment to compute and align a centration tilt vector of the lenses to a boresight of the image sensor.

4. The method of claim 3, wherein the two or more opposing segments of the metalens comprise two or more radially opposing segments of the metalens that pass in opposite directions from the center of the metalens and through at least two of the rings.

5. The method of claim 3, wherein the metalens comprises at least two different types of rings, each of the rings being associated with one of the at least two different types.

6. The method of claim 5, wherein a first type of the different types of rings includes first lens elements for enabling a minimum tilt angle assessment, and a second type of the different types of rings includes second lens elements for enabling a maximum tilt angle assessment.

7. The method of claim 6, wherein measuring the optical characteristics at the two or more opposing segments comprises:
   positioning the metalens in a first position of rotation relative the image sensor;
   assessing the minimum tilt angle and the maximum tilt angle of the lenses at the first position of rotation;
   positioning the metalens in a second position of rotation relative the image sensor; and
   assessing the minimum tilt angle and the maximum tilt angle of the lenses at the second position of rotation; and
   assessing, based on a combination of the minimum tilt angle and the maximum tilt angle of the lenses that is assessed for the first and second positions, the minimum tilt angle and the maximum tilt angle of the lenses, generally.

8. The method of claim 7, wherein the minimum tilt angle and the maximum tilt angle of the lenses, generally, is assessed further based on the minimum tilt angle and the maximum tilt angle of the lenses assessed when the metalens is positioned in one or more third positions of rotation relative the image sensor.

9. The method of claim 5, wherein a third type of the different types of rings includes third lens elements for enabling a second minimum tilt angle assessment, and a fourth type of the different types of rings includes fourth lens elements for enabling a second maximum tilt angle assessment.

10. The method of claim 1, wherein positioning the variable focal length phased metalens between the lenses and the image sensor comprises positioning the metalens adjacent to a protective glass of the image sensor.

11. The method of claim 1, wherein repositioning the lenses to align the centration tilt vector with the boresight of the image sensor comprises adjusting a tilt angle applied to the lenses relative the image sensor.

12. The method of claim 1, wherein repositioning the lenses to align the centration tilt vector with the boresight of the image sensor comprises adjusting an offset distance applied to the lenses relative the image sensor.

13. The method of claim 12, wherein the offset distance comprises a vertical offset applied to the lenses along the boresight of the image sensor at a height above a focal plane of the image sensor.

14. The method of claim 12, wherein the offset distance comprises a lateral offset applied to the lenses in one or two directions that are parallel to a focal plane of the image sensor.

15. The method of claim 1, wherein the boresight of the image sensor is normal to a focal plane of the image sensor.

16. The method of claim 1, wherein the boresight of the image sensor comprises a mechanical boresight of the camera assembly after integration of a lens holder and the image sensor, the image sensor being mounted to a printed circuit board.

17. An apparatus comprising:
   a variable focal length phased metalens configured to be used by camera modular alignment and test (CMAT) equipment during a multiple-axis lens alignment check of a camera assembly to measure modulation transfer function performance of the camera assembly after integrating a set of lenses with an image sensor included among a set of camera components,
   the metalens comprising multiple concentric rings of lens elements positioned about a center of the metalens,
   each of the rings being associated with a unique region of the metalens that is located about, and at a unique radial distance from, a center of the metalens;

the lens elements of each of the rings configured to provide a different focus capability than the lens elements of at least one other of the lens element rings to enable the CMAT equipment to compute and align a centration tilt vector of the lenses to a boresight of the image sensor.

18. A system comprising:
a variable focal length phased metalens including two or more opposing segments; and
camera modulation and alignment test (CMAT) equipment configured to:
  identify, loaded in the CMAT equipment, a set of lenses and a set of camera components including an image sensor for a camera assembly; and
  output instructions to precisely align a centration tilt vector of the lenses with a boresight of the image sensor by executing a multiple-axis lens alignment check to measure a modulation transfer function performance of the lenses after integration with the camera components, the CMAT equipment being configured to execute the alignment check by:
    positioning the metalens between the lenses and the image sensor;
    measuring optical characteristics of the lenses at each of the two or more opposing segments to determine defocusing effects of the lenses after integration with the camera components;
    computing, based on the defocusing effects of the lenses, the centration tilt vector for the lenses relative the boresight of the image sensor; and
    repositioning the lenses to align the centration tilt vector with the boresight of the image sensor to generate the instructions for precisely aligning the centration tilt vector with the boresight during production of the camera assembly.

19. The system of claim 18, wherein the two or more opposing segments of the metalens comprise two or more radially opposing segments that provide different focus capability at different radial distances from a center of the metalens.

20. The system of claim 18, wherein:
the metalens comprises multiple concentric rings of lens elements positioned about a center of the metalens,
each of the rings is associated with a unique region of the metalens that is located about, and at a unique radial distance from, a center of the metalens; and
the lens elements of each of the rings is configured to provide a different focus capability than the lens elements of at least one other of the rings to enable the CMAT equipment to compute
and align a centration tilt vector of the lenses to a boresight of the image sensor.

* * * * *